United States Patent
Sims

(10) Patent No.: US 9,092,138 B2
(45) Date of Patent: *Jul. 28, 2015

(54) MEDIA LIBRARY MONITORING SYSTEM AND METHOD

(71) Applicant: KIP CR P1 LP, New York, NY (US)

(72) Inventor: Robert C. Sims, Round Rock, TX (US)

(73) Assignee: KIP CR P1 LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/099,591

(22) Filed: Dec. 6, 2013

(65) Prior Publication Data

US 2014/0095815 A1    Apr. 3, 2014

Related U.S. Application Data

(63) Continuation of application No. 13/430,429, filed on Mar. 26, 2012, now Pat. No. 8,639,807, which is a continuation of application No. 12/692,403, filed on Jan. 22, 2010, now Pat. No. 8,650,241, which is a continuation-in-part of application No. 12/024,755, filed on Feb. 1, 2008, now Pat. No. 7,908,366, application No. 14/099,591, which is a continuation of application No. 13/459,720, filed on Apr. 30, 2012, now Pat. No. 8,631,127, which is a continuation of application No. 12/692,403, filed on Jan. 22, 2010, now Pat. No. 8,650,241, which is a continuation-in-part of application No. 12/024,755, filed on Feb. 1, 2008, now Pat. No. 7,908,366.

(51) Int. Cl.

| G06F 15/16 | (2006.01) |
|---|---|
| G06F 3/06 | (2006.01) |
| G06F 11/30 | (2006.01) |
| G06F 11/07 | (2006.01) |
| G11B 5/455 | (2006.01) |

(Continued)

(52) U.S. Cl.

CPC ............ *G06F 3/0604* (2013.01); *G06F 3/0653* (2013.01); *G06F 3/0683* (2013.01); *G06F 11/076* (2013.01); *G06F 11/0727* (2013.01); *G06F 11/3034* (2013.01); *G11B 5/4555* (2013.01); *G11B 19/048* (2013.01); *G11B 20/1816* (2013.01); *G11B 27/034* (2013.01); *G11B 27/34* (2013.01); *G06F 11/079* (2013.01); *G11B 2020/1869* (2013.01); *G11B 2220/90* (2013.01)

(58) Field of Classification Search

CPC .................................................. G06F 11/3034
USPC ......................................................... 709/224
See application file for complete search history.

(56) References Cited

U.S. PATENT DOCUMENTS

| 3,704,363 A | 11/1972 | Salmassy et al. |
|---|---|---|
| 3,984,923 A | 10/1976 | Rawson et al. |

(Continued)

FOREIGN PATENT DOCUMENTS

| EP | 0726570 | 8/1996 |
|---|---|---|
| GB | 2419198 | 4/2006 |

OTHER PUBLICATIONS

Office Action for U.S. Appl. No. 11/801,809, mailed Dec. 17, 2013, 8 pgs.

(Continued)

*Primary Examiner* — Imad Hussain

(74) *Attorney, Agent, or Firm* — Sprinkle IP Law Group

(57) ABSTRACT

Embodiments of methods and systems comprise collecting data associated with a library or library components and storing the collected data in repository. By collecting data associated with a library or library components and storing the collected data in a repository, the degradation of library components can be monitored and the reliability of library components determined, allowing unreliable components to be bypassed or replaced, enhancing the reliability of the library and preventing data loss.

18 Claims, 15 Drawing Sheets

(51) Int. Cl.
*G11B 19/04* (2006.01)
*G11B 20/18* (2006.01)
*G11B 27/034* (2006.01)
*G11B 27/34* (2006.01)

(56) References Cited

U.S. PATENT DOCUMENTS

| | | | |
|---|---|---|---|
| 4,754,345 A | 6/1988 | Karlstetter | |
| 4,932,826 A | 6/1990 | Moy et al. | |
| 4,958,235 A | 9/1990 | Sims et al. | |
| 5,253,126 A * | 10/1993 | Richmond | 360/53 |
| 5,309,768 A | 5/1994 | Mathews et al. | |
| 5,386,324 A * | 1/1995 | Fry et al. | 360/53 |
| 5,668,800 A | 9/1997 | Stevenson | |
| 5,781,703 A * | 7/1998 | Desai et al. | 706/50 |
| 5,822,516 A | 10/1998 | Krech, Jr. | |
| 5,881,221 A | 3/1999 | Hoang et al. | |
| 5,883,864 A * | 3/1999 | Saliba | 360/92.1 |
| 6,052,264 A * | 4/2000 | Curtis | 360/137 |
| 6,052,341 A | 4/2000 | Bingham et al. | |
| 6,163,853 A * | 12/2000 | Findlay et al. | 714/4.4 |
| 6,269,330 B1 * | 7/2001 | Cidon et al. | 714/43 |
| 6,304,880 B1 * | 10/2001 | Kishi | 1/1 |
| 6,490,253 B1 * | 12/2002 | Miller et al. | 370/241 |
| 6,624,958 B1 * | 9/2003 | Alva | 360/53 |
| 6,715,031 B2 * | 3/2004 | Camble et al. | 711/111 |
| 6,725,394 B1 * | 4/2004 | Bolt | 714/5.11 |
| 6,799,156 B1 | 9/2004 | Rieschl et al. | |
| 6,823,401 B2 | 11/2004 | Feather, Jr. et al. | |
| 6,839,824 B2 | 1/2005 | Camble et al. | |
| 6,950,871 B1 | 9/2005 | Honma et al. | |
| 6,971,046 B1 * | 11/2005 | Johnson et al. | 714/35 |
| 7,076,391 B1 * | 7/2006 | Pakzad et al. | 702/118 |
| 7,200,546 B1 * | 4/2007 | Nourmohamadian et al. | 703/24 |
| 7,200,722 B2 * | 4/2007 | Goodman et al. | 711/154 |
| 7,310,745 B2 | 12/2007 | Schnapp et al. | |
| 7,346,801 B2 | 3/2008 | Brunelle et al. | |
| 7,386,667 B2 | 6/2008 | Estelle et al. | |
| 7,443,801 B2 | 10/2008 | Neidhardt et al. | |
| 7,444,469 B2 | 10/2008 | Estelle et al. | |
| 7,483,810 B2 | 1/2009 | Jackson et al. | |
| 7,492,720 B2 * | 2/2009 | Pruthi et al. | 370/252 |
| 7,573,664 B2 * | 8/2009 | Bentley et al. | 360/31 |
| 7,583,604 B2 | 9/2009 | Couturier | |
| 7,596,096 B2 * | 9/2009 | Crawford et al. | 370/248 |
| 7,627,786 B2 * | 12/2009 | Bello et al. | 714/42 |
| 7,653,840 B1 * | 1/2010 | Taylor et al. | 714/47.2 |
| 7,809,990 B2 * | 10/2010 | Sasaki | 714/42 |
| 7,885,805 B2 | 2/2011 | Dickens et al. | |
| 7,908,366 B2 | 3/2011 | Sims | |
| 7,971,006 B2 | 6/2011 | Justiss et al. | |
| 7,974,215 B1 * | 7/2011 | Sims | 370/253 |
| 8,035,911 B2 * | 10/2011 | Ballard et al. | 360/69 |
| 8,108,544 B2 | 1/2012 | Ramakrishnan et al. | |
| 8,117,501 B2 * | 2/2012 | Taniyama et al. | 714/42 |
| 8,145,572 B2 | 3/2012 | Ito | |
| 8,180,824 B2 | 5/2012 | McCoy et al. | |
| 8,195,986 B2 | 6/2012 | Meaney et al. | |
| 8,495,432 B2 | 7/2013 | Dickens et al. | |
| 8,631,127 B2 | 1/2014 | Sims | |
| 8,631,281 B1 | 1/2014 | Stripling et al. | |
| 8,639,807 B2 | 1/2014 | Sims | |
| 8,644,185 B2 | 2/2014 | Sims | |
| 8,645,328 B2 | 2/2014 | Sims | |
| 8,650,241 B2 | 2/2014 | Moody, II et al. | |
| 8,832,495 B2 | 9/2014 | Foster et al. | |
| 8,843,787 B1 | 9/2014 | Foster et al. | |
| 8,949,667 B2 | 2/2015 | Foster et al. | |
| 9,015,005 B1 | 4/2015 | Stripling | |
| 2001/0039579 A1 * | 11/2001 | Trcka et al. | 709/224 |
| 2001/0040748 A1 * | 11/2001 | Nagai et al. | 360/53 |
| 2002/0006004 A1 * | 1/2002 | Miyamura | 360/53 |
| 2002/0055999 A1 | 5/2002 | Takeda | |
| 2003/0070053 A1 | 4/2003 | Gallo et al. | |
| 2003/0097439 A1 * | 5/2003 | Strayer et al. | 709/224 |
| 2003/0126395 A1 * | 7/2003 | Camble et al. | 711/173 |
| 2003/0128448 A1 * | 7/2003 | Gunderson et al. | 360/31 |
| 2003/0225865 A1 * | 12/2003 | Koestler | 709/220 |
| 2003/0233431 A1 | 12/2003 | Reddy et al. | |
| 2004/0022263 A1 | 2/2004 | Zhao et al. | |
| 2004/0078697 A1 * | 4/2004 | Duncan | 714/42 |
| 2004/0139195 A1 * | 7/2004 | Feather et al. | 709/224 |
| 2004/0139240 A1 * | 7/2004 | DiCorpo et al. | 710/3 |
| 2004/0168102 A1 | 8/2004 | Tsunoda | |
| 2005/0044451 A1 * | 2/2005 | Fry et al. | 714/38 |
| 2005/0052772 A1 * | 3/2005 | Barbian et al. | 360/69 |
| 2005/0076263 A1 * | 4/2005 | Tomita | 714/6 |
| 2005/0086554 A1 | 4/2005 | Simes | |
| 2005/0091369 A1 * | 4/2005 | Jones | 709/224 |
| 2005/0138195 A1 | 6/2005 | Bono | |
| 2005/0149829 A1 | 7/2005 | Lee | |
| 2005/0174869 A1 | 8/2005 | Kottomtharayil et al. | |
| 2005/0210161 A1 * | 9/2005 | Guignard et al. | 710/15 |
| 2005/0231846 A1 | 10/2005 | Winarski et al. | |
| 2005/0246376 A1 | 11/2005 | Lu et al. | |
| 2005/0246509 A1 * | 11/2005 | Topham et al. | 711/162 |
| 2005/0262231 A1 * | 11/2005 | Lowe et al. | 709/223 |
| 2006/0085595 A1 * | 4/2006 | Slater | 711/114 |
| 2006/0092850 A1 * | 5/2006 | Neidhardt et al. | 370/252 |
| 2006/0126211 A1 * | 6/2006 | Sasaki | 360/74.4 |
| 2006/0170238 A1 * | 8/2006 | Justiss et al. | 296/95.1 |
| 2006/0174071 A1 * | 8/2006 | Justiss et al. | 711/154 |
| 2006/0190205 A1 * | 8/2006 | Klein et al. | 702/115 |
| 2006/0242489 A1 * | 10/2006 | Brockway et al. | 714/718 |
| 2007/0025008 A1 * | 2/2007 | Ballard | 360/69 |
| 2007/0067678 A1 | 3/2007 | Hosek et al. | |
| 2007/0079048 A1 | 4/2007 | Starr et al. | |
| 2007/0106840 A1 | 5/2007 | Estelle | |
| 2007/0226336 A1 * | 9/2007 | Katagiri et al. | 709/224 |
| 2007/0253088 A1 * | 11/2007 | Clarke et al. | 360/72.2 |
| 2007/0255920 A1 | 11/2007 | Gold | |
| 2007/0294591 A1 * | 12/2007 | Usynin et al. | 714/45 |
| 2008/0019283 A1 | 1/2008 | Emile | |
| 2008/0098168 A1 | 4/2008 | Estelle | |
| 2008/0109547 A1 * | 5/2008 | Bao et al. | 709/224 |
| 2008/0115015 A1 * | 5/2008 | Ikezawa et al. | 714/42 |
| 2008/0259809 A1 | 10/2008 | Stephan et al. | |
| 2008/0282265 A1 * | 11/2008 | Foster et al. | 719/320 |
| 2009/0044047 A1 * | 2/2009 | Bates et al. | 714/7 |
| 2009/0059757 A1 * | 3/2009 | Haustein et al. | 369/53.42 |
| 2009/0070092 A1 | 3/2009 | Dickens et al. | |
| 2009/0106816 A1 | 4/2009 | Ito | |
| 2009/0113129 A1 * | 4/2009 | Deicke et al. | 711/115 |
| 2009/0177314 A1 | 7/2009 | Greco et al. | |
| 2009/0198650 A1 * | 8/2009 | Sims | 707/3 |
| 2009/0198737 A1 * | 8/2009 | Sims | 707/200 |
| 2009/0199045 A1 | 8/2009 | Kasubuchi et al. | |
| 2010/0023604 A1 * | 1/2010 | Verma et al. | 709/221 |
| 2010/0033863 A1 | 2/2010 | Fry et al. | |
| 2010/0125740 A1 | 5/2010 | Grechanik | |
| 2010/0182887 A1 * | 7/2010 | Moody et al. | 369/53.42 |
| 2010/0228805 A1 | 9/2010 | McCoy et al. | |
| 2010/0250698 A1 | 9/2010 | Haustein et al. | |
| 2010/0275219 A1 | 10/2010 | Carlson et al. | |
| 2011/0194451 A1 * | 8/2011 | Sims | 370/252 |
| 2012/0185589 A1 | 7/2012 | Sims | |
| 2012/0221597 A1 | 8/2012 | Sims | |
| 2014/0085744 A1 * | 3/2014 | Stripling et al. | 360/53 |
| 2014/0095815 A1 | 4/2014 | Sims | |
| 2014/0112118 A1 | 4/2014 | Moody, II et al. | |
| 2014/0112185 A1 * | 4/2014 | Sims | 370/252 |
| 2014/0122438 A1 | 5/2014 | Sims | |
| 2014/0325284 A1 | 10/2014 | Foster et al. | |
| 2014/0359369 A1 | 12/2014 | Foster et al. | |
| 2015/0106654 A1 | 4/2015 | Foster et al. | |

OTHER PUBLICATIONS

Office Action for U.S. Appl. No. 12/025,300, mailed Jan. 2, 2014, 33 pgs.

Notice of Allowance for U.S. Appl. No. 12/861,609, mailed Feb. 5, 2014, 3 pgs.

(56) References Cited

OTHER PUBLICATIONS

Weber, Ralph O. (ed.) Information Technology—SCSI Primary Commands—4 (SPC-4), Project T10/1731-D, Working Draft, rev. 2, Sep. 15, 2005, ENDL Texas, Dallas, TX, 499 pgs.
Penokie, George (ed.) Information Technology—SCSI Block Commands—3 (SBC-3), T10/1799-D, Working Draft, Rev. 6, Jul. 24, 2006, IBM Corp., Rochester, MN, 169 pgs.
Weber, Ralph O. (ed.) Information Technology—SCSI Primary Commands—4 (SPC-4), Project T10/1731-D, Working Draft, rev. 10, Apr. 21, 2007, ENDL Texas, Dallas, TX, 551 pgs.
Weber, Ralph O.(ed.) Information Technology—SCSI Primary Commands—3 (SPC-3), Project T10/1416-D, Working Draft, rev. 22a, Mar. 25, 2005, ENDL Texas, Dallas, TX, 496 pgs.
Oetting, Erich (ed.) Information Technology—SCSI Media Changer Commands—2 (SMC-2), INCITS T10 Project 1383D, Working Draft, rev. 7, Nov. 18, 2003, Storage Tech Corp., Louisville, CO, 68 pgs.
International Search Report and Written Opinion for International Patent Application No. PCT/US2008/63227, mailed Aug. 29, 2008, 7 pgs.
International Search Report and Written Opinion for International Patent Application No. PCT/US2009/032402, mailed Jun. 29, 2009, 11 pgs.
International Search Report and Written Opinion for International Patent Application No. PCT/US2009/032390, mailed Jul. 3, 2009, 13 pgs.
Boehler, Paul, "Common SCSI/ATAPI Command Set for Streaming Tape" QIC 157, Revision D, Quarter-Inch Cartridge Drive Standards, Santa Barbara, CA, Dec. 13, 1995, 50 pgs.
Office Action for U.S. Appl. No. 12/025,322, mailed Dec. 30, 2009, 11 pgs.
Office Action for U.S. Appl. No. 12/025,436, mailed Mar. 30, 2010, 15 pgs.
Office Action for U.S. Appl. No. 12/024,755, mailed Jun. 23, 2010, 11 pgs.
Office Action for U.S. Appl. No. 12/025,322, mailed Jul. 8, 2010, 15 pgs.
International Preliminary Report on Patentability (Ch. I) for International Application No. PCT/US2009/032402, issued on Aug. 3, 2010, 8 pgs.
International Preliminary Report on Patentability (Ch. I) for International Application No. PCT/US2009/032390 issued on Aug. 10, 2010, 8 pgs.
Office Action for U.S. Appl. No. 12/025,436, mailed Sep. 15, 2010, 21 pgs.
"SCSI DDS Tape Expert Tool (mstm Online Help)," Hewlett Packard, updated Apr. 29, 2002 and printed on Aug. 30, 2010, 8 pgs. at http://docs.hp.com/hpux/onlinedocs/diag/stm/help/expert/scsi_ddsm.htm.
Office Action for U.S. Appl. No. 11/801,809, mailed Sep. 23, 2010, 31 pgs.
Notice of Allowance for U.S. Appl. No. 12/024,755, mailed Dec. 10, 2010, 14 pgs.
Office Action for U.S. Appl. No. 11/801,809, mailed Feb. 16, 2011, 23 pgs.
Notice of Allowance for U.S. Appl. No. 12/025,322, mailed Feb. 17, 2011, 5 pgs.
Office Action for U.S. Appl. No. 12/025,436, mailed Mar. 11, 2011, 25 pgs.
International Search Report and Written Opinion for International Patent Application No. PCT/US2011/021517, mailed Apr. 19, 2011, 12 pgs.
Office Action for U.S. Appl. No. 11/801,809, mailed Jun. 7, 2011, 16 pgs.
Office Action for U.S. Appl. No. 12/025,436, mailed Aug. 22, 2011, 32 pgs.
International Preliminary Report on Patentability (Ch. II) for International Patent Application No. PCT/US08/63227, mailed Oct. 31, 2011, Patent Cooperation Treaty, 25 pgs.
Corrected International Preliminary Report on Patentability (Ch. II) for International Patent Application No. PCT/US08/63227, mailed Feb. 2, 2012, Patent Cooperation Treaty, 22 pgs.
Office Action for U.S. Appl. No. 13/459,720, mailed Aug. 1, 2012, 16 pgs.
Office Action for U.S. Appl. No. 13/430,429, mailed Aug. 2, 2012, 15 pgs.
Office Action for U.S. Appl. No. 12/025,300, mailed Aug. 6, 2012, 30 pgs.
Office Action for U.S. Appl. No. 12/861,609, mailed Aug. 7, 2012, 10 pgs.
Office Action for U.S. Appl. No. 13/091,877, mailed Oct. 11, 2012, 14 pgs.
Office Action for U.S. Appl. No. 12/025,436, mailed Nov. 9, 2012, 34 pgs.
Office Action for U.S. Appl. No. 12/861,612, mailed Nov. 27, 2012, 12 pgs.
Office Action for U.S. Appl. No. 12/888,954, mailed Dec. 13, 2012, 14 pgs.
Office Action for U.S. Appl. No. 12/861,609, mailed Jan. 4, 2013, 12 pgs.
Notice of Allowance for U.S. Appl. No. 13/430,429, mailed Feb. 11, 2013, 6 pgs.
Notice of Allowance for U.S. Appl. No. 13/459,720, mailed Feb. 11, 2013, 6 pgs.
Office Action for U.S. Appl. No. 12/025,300, mailed Feb. 15, 2013, 35 pgs.
Office Action for U.S. Appl. No. 12/692,403, mailed Feb. 20, 2013, 35 pgs.
IBM et al., Hardware and Volume Statistical Analysis and Reporting System for Detecting and Isolating Media and Hardware Errors on the Magstar Family of Tape Drives, Dec. 1, 1999, 4 pgs (IP.com No. IPCOM000013086D).
International Preliminary Report on Patentability (Ch. I) for International Patent Application No. PCT/US2011/021517, mailed Aug. 2, 2012, 8 pgs.
Notice of Allowance for U.S. Appl. No. 13/091,877, mailed Feb. 27, 2013, 10 pgs.
Notice of Allowance for U.S. Appl. No. 12/025,436, mailed Mar. 8, 2013, 10 pgs.
Office Action for U.S. Appl. No. 11/801,809, mailed Mar. 27, 2013, 13 pgs.
Notice of Allowance for U.S. Appl. No. 13/459,720, mailed May 7, 2013, 2 pgs.
Notice of Allowance for U.S. Appl. No. 13/430,429, mailed May 14, 2013, 4 pgs.
Notice of Allowance for U.S. Appl. No. 12/692,403, mailed May 14, 2013, 5 pgs.
Office Action for U.S. Appl. No. 12/861,612, mailed Jun. 11, 2013, 12 pgs.
Notice of Allowance for U.S. Appl. No. 13/091,877, mailed Jun. 11, 2013, 7 pgs.
Notice of Allowance for U.S. Appl. No. 11/801,809, mailed Jun. 20, 2013, 4 pgs.
Office Action for U.S. Appl. No. 12/025,300, mailed Jul. 30, 2013, 29 pgs.
Notice of Allowance for U.S. Appl. No. 13/430,429, mailed Aug. 1, 2013, 3 pgs.
Notice of Allowance for U.S. Appl. No. 13/459,720, mailed Aug. 5, 2013, 3 pgs.
Notice of Allowance for U.S. Appl. No. 12/692,403, mailed Aug. 16, 2013, 3 pgs.
Notice of Allowance for U.S. Appl. No. 11/801,809, mailed Aug. 22, 2013, 5 pgs.
Office Action for U.S. Appl. No. 12/888,954, mailed Aug. 23, 2013, 16 pgs.
Office Action for U.S. Appl. No. 12/861,609, mailed Sep. 6, 2013, 11 pgs.
Notice of Allowance for U.S. Patent Application No. 12/861,612, mailed Sep. 30, 2013, 12 pgs.
Notice of Allowance for U.S. Appl. No. 12/025,436, mailed Oct. 4, 2013, 5 pgs.

(56) References Cited

OTHER PUBLICATIONS

Notice of Allowance for U.S. Appl. No. 13/091,877, mailed Oct. 8, 2013, 5 pgs.
Notice of Allowance for U.S. Appl. No. 13/430,429, mailed Oct. 30, 2013, 3 pgs.
Notice of Allowance for U.S. Appl. No. 13/459,720, mailed Oct. 30, 2013, 3 pgs.
Office Action for U.S. Appl. No. 12/025,300, mailed Apr. 23, 2014, 29 pgs.
Office Action for U.S. Appl. No. 14/143,046, mailed May 7, 2014, 18 pgs.
Notice of Allowance for U.S. Appl. No. 11/801,809, mailed Mar. 25, 2014, 4 pgs.
Notice of Allowance for U.S. Appl. No. 12/025,300, mailed Sep. 24, 2014, 10 pgs.
Notice of Allowance for U.S. Appl. No. 11/801,809, mailed Jun. 27, 2014, 4 pgs.
Notice of Allowance for U.S. Appl. No. 14/324,980, mailed Aug. 25, 2014, 6 pgs.
Office Action for U.S. Appl. No. 14/092,729, mailed Dec. 24, 2014, 8 pgs.
Office Action for U.S. Appl. No. 12/888,954, mailed Jan. 5, 2015, 15 pgs.
Notice of Allowance for U.S. Appl. No. 12/025,300, mailed Jan. 16, 2015, 7 pgs.
Corrected Notice of Allowability for U.S. Appl. No. 14/324,980, mailed Oct. 24, 2014, 4 pgs.
Office Action for U.S. Appl. No. 14/464,034, mailed Nov. 5, 2014, 8 pgs.
Notice of Allowance for U.S. Appl. No. 14/324,980, mailed Nov. 24, 2014, 5 pgs.
Notice of Allowance for U.S. Appl. No. 14/143,046, mailed Dec. 18, 2014, 8 pgs.
Notice of Allowance for U.S. Appl. No. 14/464,034 mailed Dec. 19, 2014, 2 pgs.
Notice of Allowance for U.S. Appl. No. 14/143,046, mailed Feb. 12, 2015, 10 pgs.
Office Action for U.S. Appl. No. 14/574,077, mailed Feb. 25, 2015, 15 pgs.
Notice of Allowance for U.S. Appl. No. 14/464,034, mailed Mar. 9, 2015, 2 pgs.

* cited by examiner

```
<drive_log_sense timestamp="2007/07/16 10:13:38">
<sn>1210140255</sn>
<vol_id> </vol_id>
<write_errors_delay>0x0</write_errors_delay>
<write_errors_wo_delay>0x0</write_errors_wo_delay>
<write_total_error_correction_processed>0x0</write_total_error_correction_processed>
<write_total_errors>0x0</write_total_errors>
<write_total_errors_corrected>0x0</write_total_errors_corrected>
<write_total_uncorrected_errors>0x0</write_total_uncorrected_errors>
<read_errors_delay>0x0</read_errors_delay>
<read_errors_wo_delay>0x0</read_errors_wo_delay>
<read_total_error_correction_processed>0x0</read_total_error_correction_processed>
<read_total_errors>0x0</read_total_errors>
<read_total_errors_corrected>0x0</read_total_errors_corrected>
<read_total_uncorrected_errors>0x0</read_total_uncorrected_errors>
<MB_read>0x019</MB_read>
<MB_written>0x061fa</MB_written>
<MB_written_compressed>0x02a70</MB_written_compressed>
<MB_read_compressed>0x08</MB_read_compressed>
<needs_cleaning>0x0</needs_cleaning>
<status>0x0</status>
</drive_log_sense>
```

*FIG. 5*

| FIG. 6A |
|---|
| FIG. 6B |

*FIG. 6*

```
<res timestamp="2007/07/16 10:13:27">
<status>0x0</status><sn>DELL1_3134667P1589</sn>
<library timestamp="2007/07/16 10:13:27">
<robot><sn>DELL1_3134667P1589</sn></robot>
<slot><elem_id>0x1016</elem_id></slot>
<slot><elem_id>0x1015</elem_id></slot>
<slot><elem_id>0x1014</elem_id></slot>
<slot><elem_id>0x1013</elem_id></slot>
<slot><elem_id>0x1012</elem_id></slot>
<slot><elem_id>0x1011</elem_id></slot>
<slot><elem_id>0x1010</elem_id></slot>
<slot><elem_id>0x100f</elem_id><tape><vol_id>000018</vol_id><cleaning_type>0x0</cleaning_type><media_type>0x0</media_type><media_domain>0x0</media_domain></tape></slot>
<slot><elem_id>0x100f</elem_id><tape><vol_id>000008</vol_id><cleaning_type>0x0</cleaning_type><media_type>0x0</media_type><media_domain>0x0</media_domain></tape></slot>
<slot><elem_id>0x100e</elem_id><tape><vol_id>CLNU00</vol_id><cleaning_type>0x0</cleaning_type><media_type>0x0</media_type><media_domain>0x0</media_domain></tape></slot>
<slot><elem_id>0x100d</elem_id><tape><vol_id>000068</vol_id><cleaning_type>0x0</cleaning_type><media_type>0x0</media_type><media_domain>0x0</media_domain></tape></slot>
<slot><elem_id>0x100d</elem_id><tape><vol_id>000066</vol_id><cleaning_type>0x0</cleaning_type><media_type>0x0</media_type><media_domain>0x0</media_domain></tape></slot>
<slot><elem_id>0x100c</elem_id><tape><vol_id>000060</vol_id><cleaning_type>0x0</cleaning_type><media_type>0x0</media_type><media_domain>0x0</media_domain></tape></slot>
<slot><elem_id>0x100b</elem_id><tape><vol_id>000062</vol_id><cleaning_type>0x0</cleaning_type><media_type>0x0</media_type><media_domain>0x0</media_domain></tape></slot>
<slot><elem_id>0x100a</elem_id><tape><vol_id>000062</vol_id><cleaning_type>0x0</cleaning_type><media_type>0x0</media_type><media_domain>0x0</media_domain></tape></slot>
```

*FIG. 6A*

```
<slot> <elem_id>0x1009</elem_id> <tape> <vol_id>000064
</vol_id> <cleaning_type>0x0</cleaning_type> <media_type>0x0</media_type> <media_domain>0x0</media_domain> </tape> </slot>
<slot> <elem_id>0x1008</elem_id> <tape> <vol_id>000117
</vol_id> <cleaning_type>0x0</cleaning_type> <media_type>0x0</media_type> <media_domain>0x0</media_domain> </tape> </slot>
<slot> <elem_id>0x1007</elem_id> <tape> <vol_id>000027
</vol_id> <cleaning_type>0x0</cleaning_type> <media_type>0x0</media_type> <media_domain>0x0</media_domain> </tape> </slot>
<slot> <elem_id>0x1006</elem_id> <tape> <vol_id>000108
</vol_id> <cleaning_type>0x0</cleaning_type> <media_type>0x0</media_type> <media_domain>0x0</media_domain> </tape> </slot>
<slot> <elem_id>0x1005</elem_id> <tape> <vol_id>000015
</vol_id> <cleaning_type>0x0</cleaning_type> <media_type>0x0</media_type> <media_domain>0x0</media_domain> </tape> </slot>
<slot> <elem_id>0x1004</elem_id> <tape> <vol_id>000038
</vol_id> <cleaning_type>0x0</cleaning_type> <media_type>0x0</media_type> <media_domain>0x0</media_domain> </tape> </slot>
<slot> <elem_id>0x1003</elem_id> <tape> <vol_id>000028
</vol_id> <cleaning_type>0x0</cleaning_type> <media_type>0x0</media_type> <media_domain>0x0</media_domain> </tape> </slot>
<slot> <elem_id>0x1002</elem_id> <tape> <vol_id>000003
</vol_id> <cleaning_type>0x0</cleaning_type> <media_type>0x0</media_type> <media_domain>0x0</media_domain> </tape> </slot>
<slot> <elem_id>0x1001</elem_id> <tape> <vol_id>000016
</vol_id> <cleaning_type>0x0</cleaning_type> <media_type>0x0</media_type> <media_domain>0x0</media_domain> </tape> </slot>
<slot> <elem_id>0x1000</elem_id> <tape> <vol_id>000103
</vol_id> <cleaning_type>0x0</cleaning_type> <media_type>0x0</media_type> <media_domain>0x0</media_domain> </tape> </slot>
<cap> <elem_id>0x10</elem_id> </cap>
<drive> <elem_id>0x101</elem_id> <sn>1210139351</sn> <transport_type>0x37</transport_type> <media_domain>0x4c</media_domain> </drive>
<drive> <elem_id>0x100</elem_id> <sn>1210140255</sn> <transport_type>0x37</transport_type> <media_domain>0x4c</media_domain> </drive>
</library>
</res>
```

*FIG. 6B*

```
                                                    <res timestamp="2007/01/29 09:55:05">
                                                    <status>0x0</status>
                                                    <sn>DELL1_3134667P1589</sn>
                                                    <library timestamp="2007/01/29 9:55:05">

<robot><sn>DELL1_3134667P1589</sn></robot>
                                                    <slot><elem_id>0x1009</elem_id></slot>
                                                    <slot><elem_id>0x1008</elem_id></slot>
                       510                          <slot><elem_id>0x1007</elem_id></slot>
    ┌─────────────────────────────────────┐         <slot><elem_id>0x1006</elem_id></slot>
<res timestamp="2007/01/29 09:55:05">                <slot><elem_id>0x1005</elem_id></slot>
<status>0x0</status>                                 <slot><elem_id>0x1004</elem_id></slot>
<sn>DELL1_3134667P1589</sn>                          <slot><elem_id>0x1003</elem_id></slot>
<library timestamp="2007/01/29 9:55:05">             <slot><elem_id>0x1002</elem_id></slot>
                                                    <slot><elem_id>0x1001</elem_id></slot>
<robot><sn>DELL1_3134667P1589</sn></robot>           <slot><elem_id>0x1000</elem_id></slot>
<slot><elem_id>0x1009</elem_id></slot>               <cap><elem_id>0x10</elem_id></cap>
<slot><elem_id>0x1008</elem_id></slot>               <drive>
<slot><elem_id>0x1007</elem_id>                      <elem_id>0x101</elem_id>
  <tape>                                             <sn>1210139351</sn>
  <vol_id>000105</vol_id>                            <transport_type>0x37</transport_type>
  <cleaning_type>0x0</cleaning_type>                 <transport_domain>0x4c</transport_domain>
  <media_type>0x0</media_type>        530
  <media_domain>0x0</media_domain>   ─────▶          <tape>
  </tape>                                            <vol_id>000105</vol_id>
</slot>                                              <cleaning_type>0x0</cleaning_type>
<slot><elem_id>0x1006</elem_id></slot>               <media_type>0x0</media_type>
<slot><elem_id>0x1005</elem_id></slot>               <media_domain>0x0</media_domain>
<slot><elem_id>0x1004</elem_id></slot>               </tape>
<slot><elem_id>0x1003</elem_id></slot>               </drive>
<slot><elem_id>0x1002</elem_id></slot>               <drive>
<slot><elem_id>0x1001</elem_id></slot>               <elem_id>0x100</elem_id>
<slot><elem_id>0x1000</elem_id></slot>               <sn>1210140255</sn>
<cap><elem_id>0x10</elem_id></cap>                   <transport_type>0x37</transport_type>
<drive>                                              <transport_domain>0x4c</transport_domain>
<elem_id>0x101</elem_id>                             <tape>
<sn>1210139351</sn>                                  <vol_id>000019</vol_id>
<transport_type>0x37</transport_type>                <cleaning_type>0x0</cleaning_type>
<transport_domain>0x4c</transport_domain>            <media_type>0x0</media_type>
</drive>                                             <media_domain>0x0</media_domain>
<drive>                                              </tape>
<elem_id>0x100</elem_id>                             </drive>
<sn>1210140255</sn>                                  </library>
<transport_type>0x37</transport_type>                </res>
<transport_domain>0x4c</transport_domain>           └─────────────────────────────────┘
<tape>                                                             520
<vol_id>000019</vol_id>
<cleaning_type>0x0</cleaning_type>
<media_type>0x0</media_type>
<media_domain>0x0</media_domain>
</tape>
</drive>
</library>                                          FIG. 7
</res>
```

FIG. 15

MEDIA LIBRARY MONITORING SYSTEM AND METHOD

CROSS-REFERENCE TO RELATED APPLICATION

This application is a continuation of and claims a benefit of priority under 35 U.S.C. 120 of the filing date of U.S. patent application Ser. No. 13/430,429 by inventor Sims, entitled "Media Library Monitoring System and Method" filed Mar. 26, 2012, and U.S. patent application Ser. No. 13/459,720 by inventor Sims, entitled "Media Library Monitoring System and Method" filed Apr. 30, 2012, which are hereby fully incorporated by reference, and are continuations of, and claim benefit of priority under 35 U.S.C. 120 to the filing date of U.S. patent application Ser. No. 12/692,403 by inventors Moody et al., entitled "System and Method for Identifying Failing Drives or Media in Media Library" filed Jan. 22, 2010, which is fully incorporated herein by reference and which is a continuation-in-part of and claims the benefit of priority of U.S. patent application Ser. No. 12/024,755 by inventor Sims, entitled "Media Library Monitoring System and Method" filed Feb. 1, 2008, issued as U.S. Pat. No. 7,908,366 on Mar. 15, 2011, which is hereby fully incorporated by reference herein.

TECHNICAL FIELD

This disclosure describes various embodiments of methods and systems for monitoring a media library. More particularly, embodiments include methods and systems for collecting data associated with library components and storing the collected data in a repository.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote library. Typically, a library includes a variety of components which include a plurality of media for data storage, such as, for example, multiple magnetic tapes. Centralized data backup has the advantage of increased volume, efficiency and redundancy.

In many systems, the data to be backed up and backup commands are sent over a network from multiple machines on the network to a library. In many instances, the data to be backed up and the backup commands are routed to the library through a switch.

One example of a library commonly used in enterprise backup systems is a magnetic tape library. A magnetic tape library can comprise components such as tape cartridges (containing magnetic tape), robots, tape slots and tape drives. A typical magnetic tape library contains multiple cartridge slots in which tape cartridges can be stored. Tape cartridges, commonly referred to as tapes, are physically moved between cartridge slots and tape drives by a robot. The robot is controlled by commands received from the host devices on the network. When specific data is required, a host device determines which cartridge slot contains the tape cartridge that holds the desired data. The host device then transmits a move-element command to the robot and the robot moves the tape cartridge to a tape drive which reads the desired data from the tape cartridge.

In a SCSI tape library, devices that are part of the library are typically addressed by target number. Thus, each drive and robot of a tape library typically has a target number. Cartridge slots, on the other hand, are addressed by element numbers that are used by the robot to locate the slots. Because the robot also places tape cartridges in the drives, each drive is also associated with an element number.

Components of a library are subject to wear and other forms of degradation. The degradation of library components can deleteriously affect the reliability of the library.

SUMMARY

Embodiments of methods and systems regard monitoring a library or components of the library. A method for monitoring a library or library components may comprise collecting data, wherein collecting data comprises querying a library component at intervals and receiving returned data, and storing the collected data in a repository. The collected data may be formatted into structures and arranged in an order in the repository. The data in the repository may be accessed and displayed to a user using a user interface.

Embodiments of methods and systems for monitoring a library or components of the library can include a system comprising a controller and a set of computer instructions executable by the controller to implement the above-described method. Other embodiments may include a software product comprising computer instructions executable to implement the above-described method. In a further embodiment, computer readable media may contain computer instructions operable to implement the above-described method.

Embodiments of the above methods and systems allow for the non-intrusive collection of data associated with a library or library components in a repository such that the data can be analyzed by a user and the library and components of the library can be monitored over time. For example, data in the repository can be analyzed to monitor the utilization of library components over time to determine if library components are being over- or under-utilized. As a specific example, data collected in the repository can be analyzed to determine if individual drives of the library are being over- or under-utilized. Over-utilizing an individual drive may increase library backup time and may cause excessive wear on the over-utilized drive or on components associated with the over-utilized drive.

BRIEF DESCRIPTION OF THE FIGURES

A more complete understanding of embodiments of methods and systems and the advantages thereof may be acquired by referring to the following description, taken in conjunction with the accompanying drawings in which like reference numbers indicate like features and wherein:

FIG. 5 depicts an XML representation of one embodiment of a data structure;

FIGS. 6A and 6B (FIG. 6) depicts an XML representation of one embodiment of a data structure;

FIG. 7 depicts XML representations of embodiments of data structures;

FIG. 15 is one example of a graphical user interface for displaying data.

DETAILED DESCRIPTION

Figure 1:
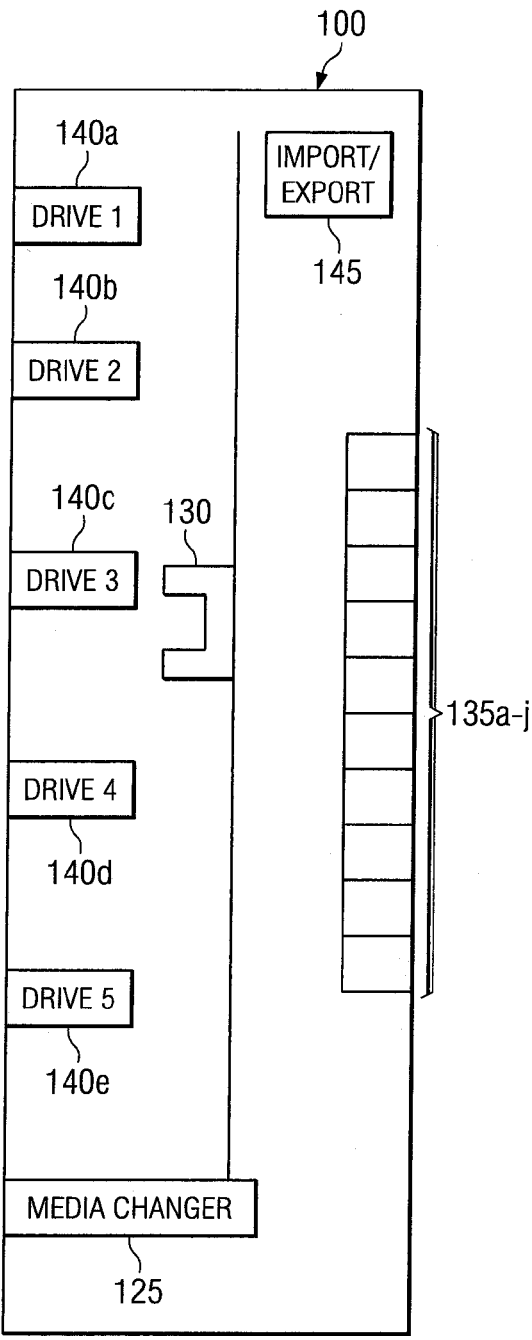
FIG. 1 is a diagrammatic representation of one embodiment of a library.

Embodiments of systems and methods for library monitoring are illustrated in the FIGURES, like numerals being used to refer to like and corresponding parts of the various drawings.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Media library monitoring systems can collect data associated with a media library and components of the media library. Data may be collected over time and stored in the repository such that the repository contains data associated with individual library components such as, for example, drives, media changers or other library components. Because the repository contains data associated with different library components and because the data in the repository extends over time, the data in the repository may be organized such that the data is organized with respect to time and with respect to the individual library components or according to other parameters.

A user interface may be used to display the collected and organized data to a user and the user may select data to view utilizing the user interface. Thus, collecting data in a repository over time and organizing the data allows a library and individual library components to be monitored and problems with the library or library components to be identified and rectified, for example, by allowing unreliable or unacceptably degraded components to be identified and bypassed or replaced, thereby enhancing the reliability of the library and proactively preventing data loss.

FIG. 1 is a diagrammatic representation of one embodiment of a media library, in this example, a tape library. Library 100 can comprise drives 140a-140e, media changer 125 and associated robot 130, import/export element(s) 145 and slots 135a-135j. Drives 140a-140e can read/write data from/to magnetic tape (contained within cartridges), eject tape cartridges and perform other operations. Slots 135a-135j store the magnetic tape cartridges when they are not in a drive and robot 130 moves the magnetic tape cartridges between drives 140a-140e and slots 135a-135j. For example, robot 130 may move a tape cartridge stored at slot 135a to drive 140b so that data can be written to the tape cartridge. It should be noted that libraries may employ a single robot or multiple robots in an expandable or modular configuration.

To collect data associated with a library or library components, a monitoring appliance can query a library or library components over a network utilizing commands. In response to received commands, the library or library components may return data associated with a particular command to the monitoring appliance. In one embodiment, a monitoring appliance can query a library over a network utilizing SCSI commands such as the Read Element Status command, Log Sense Command, Inquiry Command and other commands.

A Read Element Status (RES) command is a command which is used to query the state of a library. A RES command is sent to a media changer and in response, the media changer returns data associated with the library or the media changer. Such data may include the locations of individual tape cartridges. Thus a RES command provides a snapshot of a library at any one time. Examples of a RES command can be found in "SCSI Media Changer Commands-2 (SMC-2)", (INCITS T10 Project 1383D), Revision 7, Nov. 18, 2003, propagated by the T10 Technical Committee of the InterNational Committee on Information Technology Standards (INCITS), which is hereby incorporated by reference.

A Log Sense (LS) command is a command which is used to obtain data associated with a particular drive. A LS command is sent to a particular drive of a library and in response, the drive returns data associated with the drive and/or the media contained in the drive depending on the actual LS command. For example, such data might include: read errors, write errors, utilization and performance data, data regarding the data written and read to a media, media loaded, detail tables or other data. In one embodiment, the amount of data written over a period of time may be derived from data returned in response to one or more LS commands. More specifically, data returned in response to an LS command may include Log Sense page 0xC, 0x32 or 0x39 which may include data from which the amount of data written by a particular drive over a period of time may be derived. In one embodiment, deriving the amount of data written by a particular drive over a period of time may comprise one or more calculations. Examples of a LS command can be found in "SCSI Primary Commands-3 (SPC-3)", (Project T10/1416-D), Revision 22a, Mar. 25, 2005, propagated by the T10 Technical Committee of the InterNational Committee on Information Technology Standards (INCITS), which is hereby incorporated by reference.

An Inquiry command is a command that is used to query relatively static information (which may include, for example, serial number, manufacturer or other relatively static information) from components of a library such as a drive or a media changer. According to one embodiment, Inquiry commands are used to query individual library components. That is, an individual Inquiry command may query a particular library component. Examples of an Inquiry command can be found in "SCSI Primary Commands-3 (SPC-3)", (Project T10/1416-D), Revision 22a, Mar. 25, 2005, propagated by the T10 Technical Committee of the InterNational Committee on Information Technology Standards (INCITS), referenced above.

Methods and systems for collecting data from a library or library components can utilize a monitoring appliance which can be a Read Verify Appliance (RVA). The monitoring appliance queries a library or library components over time by sending RES, LS, Inquiry commands and/or other commands to the library or library components at intervals. Data returned in response to the commands is collected in a repository such that the repository may contain data associated with a plurality of library components of a library. For example, the repository may contain data regarding all the drives in a library. Data within the repository may be organized to allow a user to monitor various library components. For example, data may be organized in a chronological order so that a user can monitor the incidence of errors (for example, soft and hard read or write errors) over time. The data may further be organized such that superfluous data is removed. For example, redundant data might not be displayed to a user or might be purged from the repository. Likewise, unnecessary data or data that the system is configured not to monitor might be purged from the repository or not saved to the repository in the first place.

Figure 2A:
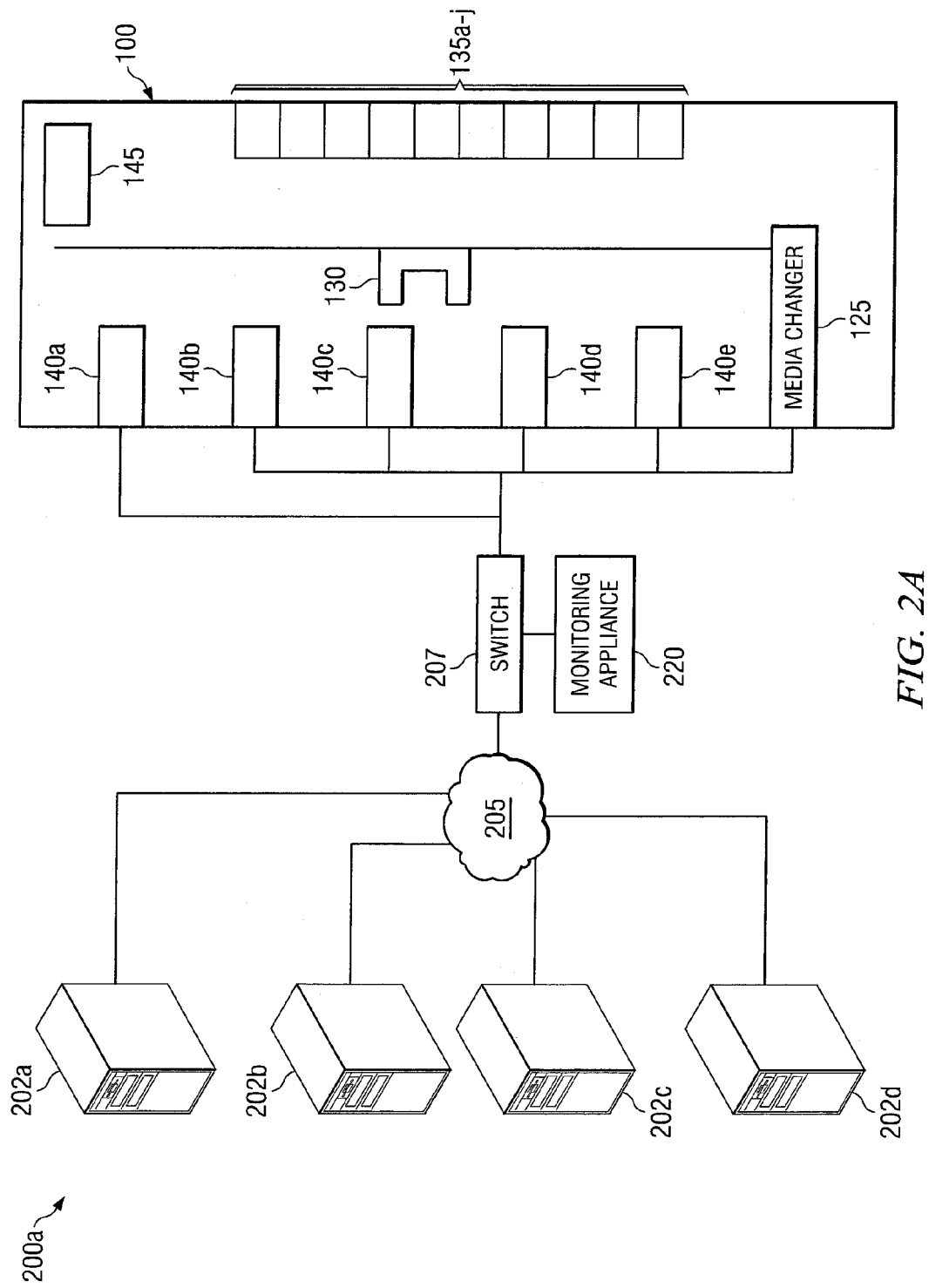
FIGS. 2A, 2B, and 2C are diagrammatic representations of embodiments of example network topologies comprising a library and a monitoring appliance.

FIG. 2A is a diagrammatic representation of a system 200a in which a plurality of hosts 202a-202d have access to library 100 over network 205. Network 205 can comprise the Internet, a SAN, a LAN, a WAN, a wireless network or any other communications network known in the art. Hosts 202a-202d are coupled to library 100 via network 205 and switch 207. Similarly, library 100 can communicate with switch 207 over any suitable communications link or network known in the art and can use additional protocols such as iSCSI, TCP/IP, or other protocol known in the art. Monitoring appliance 220 is coupled to switch 207 such that it can send commands to library 100 or library components of library 100.

Switch 207 is connected to library 100. Thus switch 207 can forward commands (such as, for example, RES, LS or Inquiry commands) from monitoring appliance 220 to library 100. Switch 207 receives data generated in response to the commands from library 100 and forwards the data to monitoring appliance 220 which collects the data in a repository. Thus monitoring appliance 220 can continually query library 100 and components of library 100 for data which can be stored in a repository, allowing a user to monitor the components of library 100. Because monitoring appliance 220 collects data by sending commands to a library, monitoring appliance 220 does not need to intercept commands or responses from network 205 to obtain data associated with a library or library components. Thus, in one embodiment, monitoring appliance 220 can be an out-of-band appliance. This allows monitoring appliance 220 to be a non-intrusive device which does not monitor or interfere with commands from and responses to hosts 202a-202d. Consequently, monitoring appliance 220 can be a compartmentalized device which can be connected to a switch and which does not have to be integrated into network 205. An advantage of this out-of-band methodology is that a monitoring appliance can be used to monitor library components without cumbersome configuring.

Figure 2B:
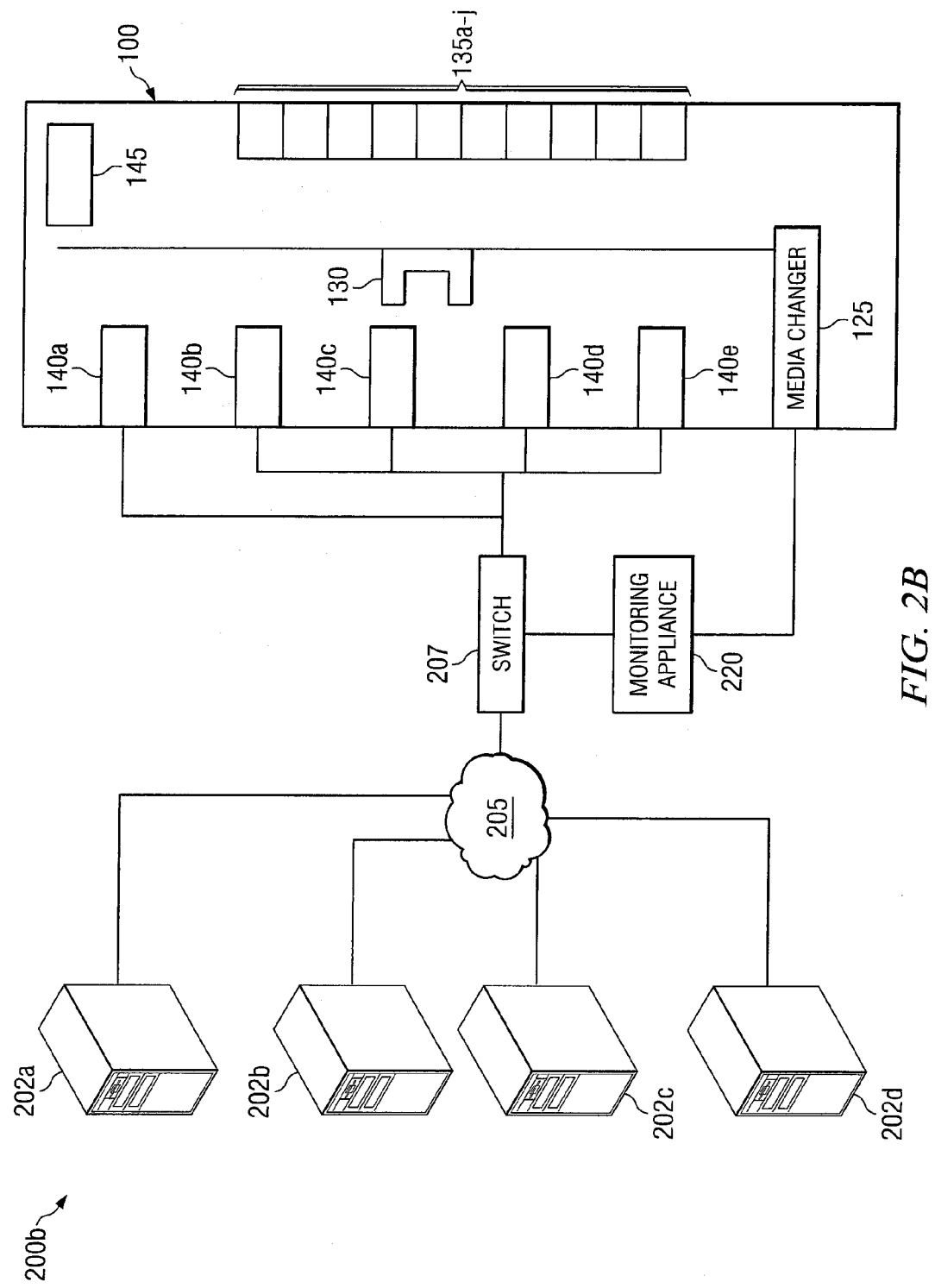
Figure 2C:
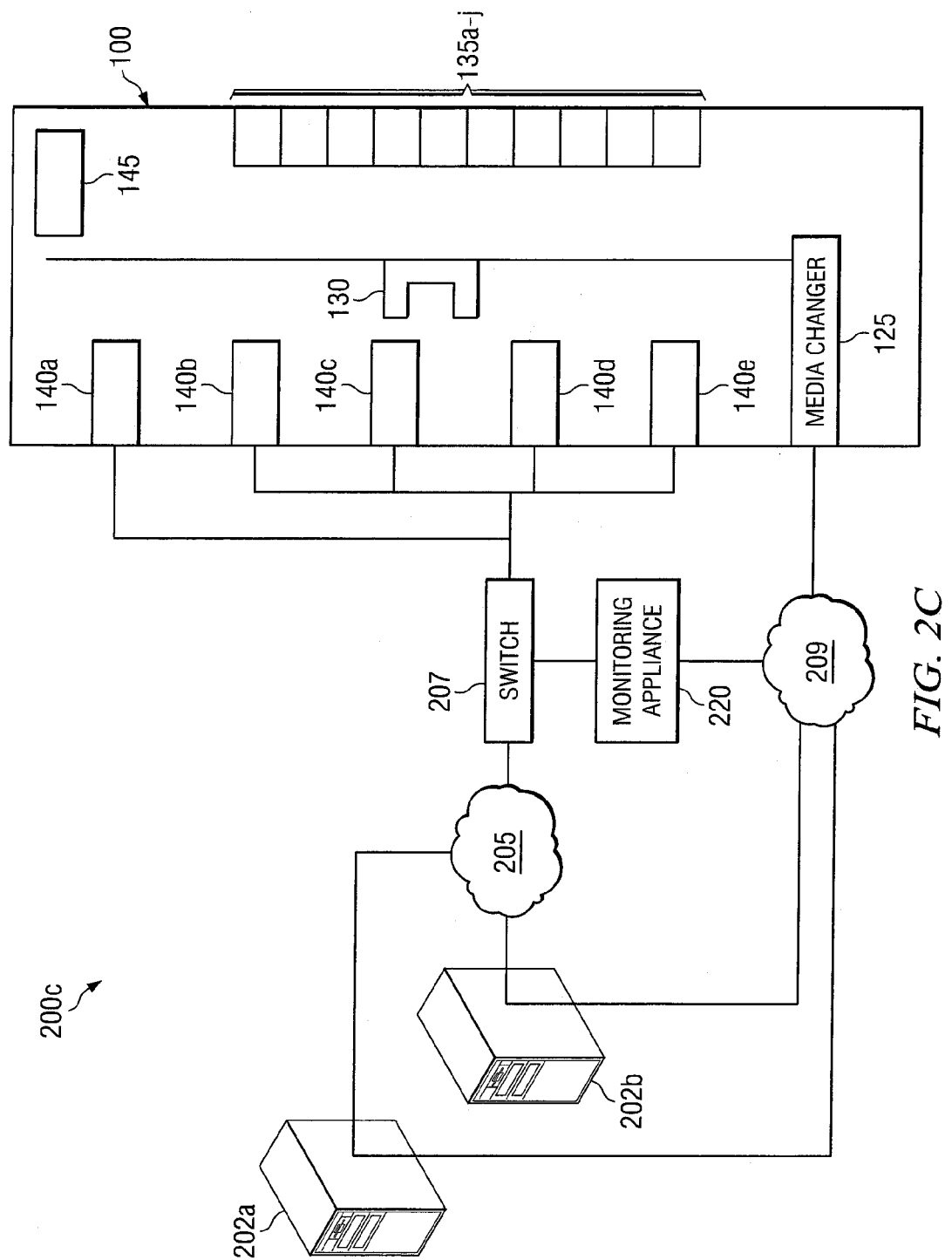

While a particular network topology is shown in FIG. 2A, a monitoring appliance may be used in other network topologies to collect data associated with a library or library components. FIGS. 2B and 2C are diagrammatic representations of example network topologies in which a monitoring appliance can be used to collect data associated with a library or components of the library.

For example, FIG. 2B is a diagrammatic representation of a system 200b having a network topology in which monitoring appliance 220 is coupled to media changer 125 and coupled to drives 140a-140e through switch 207. Thus, monitoring appliance 220 can communicate with (by, for example, sending commands to or receiving data from) media changer 125 and drives 140a-140e. By way of further example, FIG. 2C is a diagrammatic representation of a system 200c having a network topology in which monitoring appliance 220 is coupled to drives 140a-140e through switch 207 and is coupled to media changer 125 through network 209. Thus, monitoring appliance 220 can communicate with media changer 125 and drives 140a-140e. In system 200c, networks 205 and 209 can be different types of networks. For example, network 205 might be a fibre channel network whereas network 209 might be a IP network. It should be noted, however, that the topologies of systems 200a, 200b and 200c are provided by way of example and not limitation.

While shown as a physical media library in FIG. 2A-2C, library 100 can be a virtual media library that is a virtual representation of one or more physical media libraries as presented by switch 207, a library controller or other component. Examples of library virtualization are described in U.S. patent application Ser. No. 10/704,265, entitled "System and Method for Controlling Access to Multiple Physical Media Libraries," and U.S. patent application Ser. No. 10/703,965, entitled "System and Method for Controlling Access to Media Libraries," both of which are hereby incorporated by reference herein.

Figure 3:
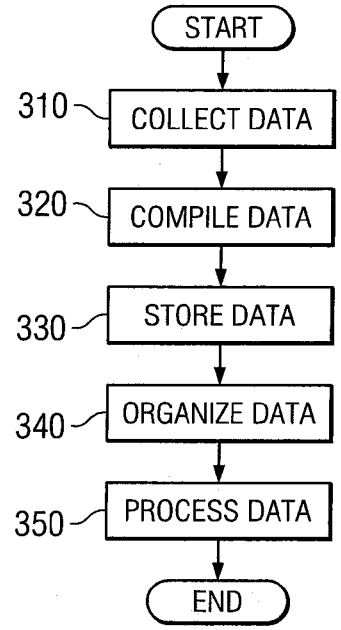
FIG. 3 is a flowchart of one embodiment of a method for collecting or storing data.

FIG. 3 is a flow chart illustrating one embodiment of a method for collecting data and organizing the collected data so that it can be accessed by or displayed to a user. According to one embodiment, the method of FIG. 3 can be implemented as a set of computer executable instructions stored on a computer readable medium at, for example, monitoring appliance 220. The set of computer executable instructions can, when executed, collect data associated with library components in a non-intrusive manner. At collect data step 310, data is collected by a monitoring appliance by querying library components of a library for data by sending commands corresponding to the library components to the library components. In response, the library components return data associated with the library components. More specifically, in one embodiment, RES, LS and Inquiry commands are sent to library components and, in response, the library components return corresponding data. Data may be collected over time by collecting data from library components at intervals. For example, various commands can be sent every 10 seconds, every 20 seconds or with any other frequency. Thus, over time, library components may be queried a plurality of times, and as a result, the repository may contain data regarding library components at different points in time.

The monitoring appliance, at compile data step 320, can compile the returned data. For example, the monitoring appliance can compile the data in defined structures which, in one embodiment, may include XML structures or other structures or equivalents. A structure may contain data associated with a library component returned in response to one or more commands (such as, for example, RES, LS or Inquiry commands). For example, a XML structure can include data from RES commands and serial numbers of library components determined from Inquiry commands issued to corresponding library components. At store data step 330, the monitoring appliance stores the returned data in a repository. Storing data in a repository may comprise storing structures in the repository or may comprise unpacking returned data compiled at compile step 320 and storing the data in the repository. In one embodiment, the data may be stored in records in a database at the repository.

At organize data step 340, the data in the repository is organized. As part of step 340, data in the repository can be arranged in chronological order and/or superfluous or redundant data can be purged. Corresponding data can be grouped together. For example, data structures corresponding to a particular drive may be arranged in chronological order within the repository.

At process data step 350, data in the repository may be processed to display desired data to a user. For example, a user may only want to see data corresponding to a particular library component. At process data step 350, the data in the repository is processed such that the desired data is selected to be displayed to a user. Similarly, data may be processed into graphs or charts, or in accordance with any number of purposes or user desires.

In one embodiment, processing data in the repository can comprise comparing returned library states or data regarding the locations of individual tape cartridges stored in the repository to track the movement of one or more tape cartridges. For example, data in the repository corresponding to different times can be compared and the movement of tape cartridges in a library tracked by differencing the locations of tape cartridges in a library at different times. In embodiments in which data is stored in records in a database, records associated with different times may be compared to track the movement of tape cartridges. Processing data can further comprise correlating errors with a particular library component based on the movement of one or more tape cartridges within the library.

Figure 4:
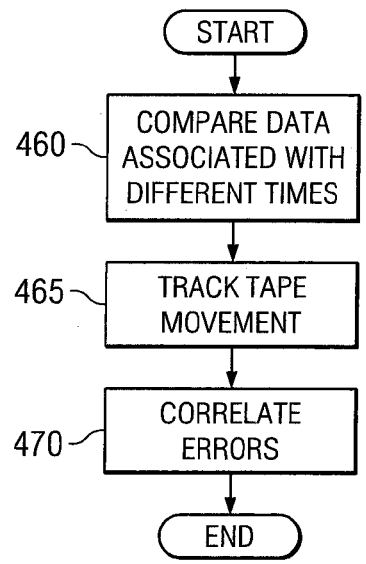
FIG. 4 is a flowchart of a method for tracking tape movements.

FIG. 4 is a flow chart illustrating one embodiment of a method for tracking the movement of one or more tape cartridges which can be implemented as part of process data step 350 of FIG. 3. According to one embodiment, the method of FIG. 4 can be implemented as a set of computer executable instructions stored on a computer readable medium at, for example, monitoring appliance 220. At step 460, data which may be, for example, data contained in structures or database records associated with different times may be compared. Based on comparisons between data, tape movements within the library can be tracked (step 465). For example, if in one structure or record associated with a time, a tape was at a specified drive in the library and in another structure or record corresponding to a subsequent time, the same tape is in a slot, it can be determined that the tape has been moved from the drive to the slot. Based on such comparisons between data in the repository, the movement of tapes within a library can be tracked over time. At step 470, errors may be correlated with library components based on tape movements. This allows the monitoring appliance to monitor the degeneration of library components. For example, if a drive registers an increasing number of errors, regardless of the robot or tape used with the drive, then the drive is likely degenerating and becoming increasingly unreliable. Accordingly, this allows the failing drive to be identified and bypassed or replaced before it causes data loss or library failure. While the method shown in FIG. 4 is described in the context of process data step 350 of FIG. 3, the method of FIG. 4 may be implemented as part of other steps, for example, as part of organize data step 340.

As described above, tracking the movement of tape cartridges or other media allows sources of errors to be identified. For example, a tape cartridge may encounter errors when used with a tape drive A but may encounter no errors when used with other tape drives. If other tape cartridges encounter errors when used with tape drive A, but encounter no errors when used with other tape drives, this implies that tape drive A is unreliable. Accordingly, tape drive A may be bypassed or replaced. Thus, by tracking the movement of one or more tape cartridges, errors can be correlated to a particular tape or drive. Tracking cartridges in a library and correlating data (such as, for example, errors or other data) with cartridges or drives is described in U.S. patent application Ser. No. 11/801,809, entitled "Method and System for Non-Intrusive Monitoring of Library Components," which is hereby incorporated by reference.

Returning to FIG. 3, the above method or steps of the above method set forth in FIG. 3 may be repeated at intervals over time such that the repository contains data associated with the library and components of the library over a period of time. For example, data associated with a library may be continually collected and compiled over time (steps 310 and 320). The period of time may be of any length, for example, days, weeks, months, years or any other length of time.

FIG. 5 is an example XML representation of a data structure containing data returned in response to an Inquiry command and a LS command. The data in the data structure may be stored in a repository along with data from multiple similar data structures containing data collected at different points in time, and the data may be organized in a chronological or other order in the repository. More specifically, in one embodiment, data may be unpacked from the data structure and stored in the repository. In a further embodiment, data may be stored in records in a database contained in the repository.

FIG. 6 is an example XML representation of a data structure containing data returned in response to an Inquiry command and a RES command. The data in the data structure may be stored in a repository along with data from multiple similar data structures containing data collected at different points in time, and the data may be organized in a chronological or other order in the repository. More specifically, in one embodiment, data may be unpacked from the data structure and stored in the repository. In a further embodiment, data may be stored in records in a database contained in the repository.

FIG. 7 is an example comparison of XML representations of structures, for example data structures, containing data returned in response to RES commands issued at different times. Comparing data may allow for the movement of tape cartridges within a library to be tracked. Because a RES command queries the state of a library, each structure in FIG. 7 may contain data regarding the state of the library, i.e. the location of tapes within the library at different times. Structure 510 contains data associated with a time. Structure 520 contains data associated with a subsequent time. By comparing the differences in the data, it is possible to determine that the tape with volume identity 000105 has moved from the slot at element identity 0x1007 to the drive at element identity 0x101. This movement is shown by directional arrow 530.

Figure 8:
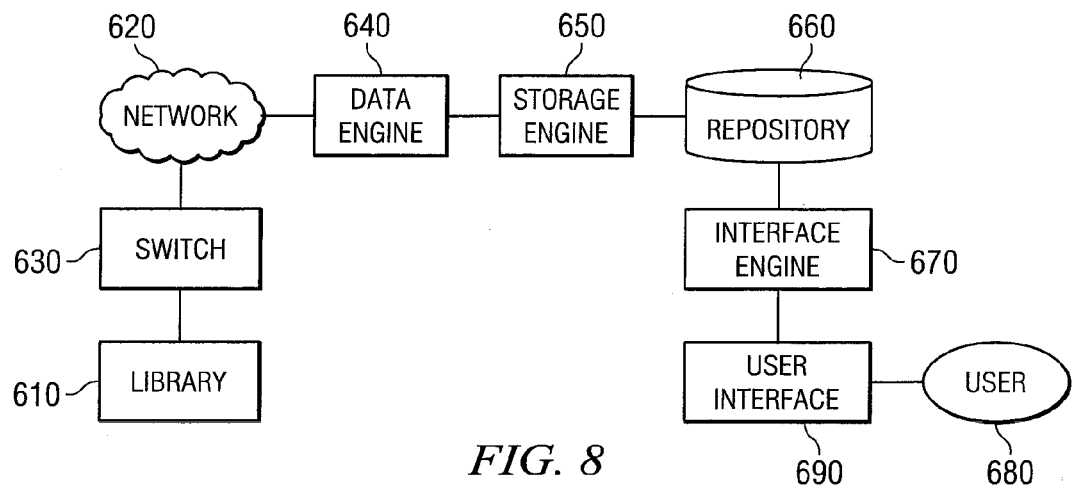
FIG. 8 is one example of a block diagram of a system for collecting or storing data.

FIG. 8 is a diagrammatic representation of a system operable to collect data from a library or library components and store the collected data in a repository where it can be accessed by a user (virtual or otherwise). In FIG. 8, library 610 (which in one embodiment may be, for example, a library such as library 100 of FIG. 1 or any other library) is coupled to network 620 via switch 630 such that library 610 can receive commands sent over network 620. Data Engine 640 is also coupled to network 620 such that it can send commands over network 620 and receive data over network 620. Data engine 640 is coupled to storage engine 650 such that it can forward data to storage engine 650. In turn, storage engine 650 is coupled to repository 660 such that it can store data in repository 660. Interface engine 670 allows user 680 to access data stored in repository 660 utilizing user interface 690. According to one embodiment, data engine 640, storage engine 650, repository 660, interface engine 670 or user interface 690 can be implemented as a set of computer executable instructions stored on a computer readable medium at, for example, monitoring appliance 220.

Data Engine 640 of FIG. 8 collects data from library 610 by sending commands (which in on embodiment may include, for example, RES, LS or Inquiry commands) over network 620 to library 610 or library components of library 610. In response, library 610 or corresponding library components return data corresponding to the received commands over network 620 to data engine 640. Data engine 640 receives the data and forwards the collected data to storage engine 650. Storage engine 650 stores the data in repository 660. For example, in one embodiment, data returned in response to an Inquiry command and a LS command may be formatted into a single XML structure at data engine 640 and forwarded to storage engine 650. Storage engine 650 may receive XML structures or other structures containing data, unpack the data and store the data in repository 660. In a further embodiment, storage engine 650 stores the data in records contained in a database at repository 660. Through the repetition of the above described process at intervals over time, repository comes to contain data associated with the library and components of the library over a period of time. Data contained in repository 660 may be organized. Organizing data may include, for example, organizing data in a chronological or other order or purging redundant data.

Collecting data associated with a library or library components in repository 660 and organizing the data allows a user to view the data to monitor library components. In FIG. 8, user 680 may access data in repository 660 via interface engine 670 utilizing user interface 690. In one embodiment, user interface 690 is a graphical user interface (GUI), which allows for a user-friendly display of data contained in repository 660. User interface 690 may be capable of displaying desired data to user 680 or displaying data which may be useful in monitoring library components. For example, user 680 may utilize user interface 690 to select desired data to display in a graphical form. The desired data may be data regarding a particular library component of library 610 or data regarding a particular type of error. Desired data may span a user specified period. More specifically, user 680 may use user interface 690 to display write errors of a particular drive for a day, month, year or any other period. If the write errors increase over time, the drive may be degrading and may need to be replaced.

While in the above example, data engine 640, storage engine 650, repository 660, interface engine 670 or user interface 690 are described as being part of a monitoring device, data engine 640, storage engine 650, repository 660, interface engine 670 or user interface 690 may be contained in a component that is not physically part of the monitoring appliance.

For example, data could be collected and compiled at the monitoring device but stored in memory coupled to the monitoring appliance. In one embodiment, interface engine 670 or user interface 690 run on a host computer which is coupled to repository 660 over a network. User 680 can access data in repository 660 utilizing interface engine 670 or user interface 690 which may be running on the host computer. Thus, a user may access the data in repository 660 over a network. Collected and compiled data may be partially stored in the monitoring appliance and partially stored in separate memory. In one example, a portion of collected data may be stored in a memory which is a component of data engine 640 or storage engine 650, while a portion of collected data may be stored in a memory which is a component of repository 660 or interface engine 670. Repository 660 of FIG. 8 may include a database, spreadsheet or other computer program in which data can be stored. In a network comprising multiple libraries, each library may have a corresponding data engine or storage engine which may forward collected data to a common repository or monitoring appliance.

It should be noted that the intervals between querying a library or library components can be fixed periods of time or of variable duration or a combination of the two. Individual library components may also be queried at different intervals: for example, a drive that is being heavily used may be queried more frequently than a drive which is not being used. In one embodiment, the data engine queries a library or library component every 30 seconds. In another embodiment, the time duration between querying is less than the backup time or the tape movement time. In further embodiments, the intervals can be determined by computer algorithm or user input.

It should further be noted that data may be derived from collected data and stored in the repository or other data storage. More specifically, collected data returned in response to one or more commands may be used to derive derived data which may be stored in the repository. Deriving derived data may comprise one or more calculations. The derived data may be organized. For example, derived data may be stored in particular records in a database. Examples of derived data may include, for example, the bits read by a drive over time (which may be, for example, in bits/second), the data transfer rate of a drive or other data. Statistical analysis may be performed on data stored in a repository. For example, statistical analysis may be performed on collected data or derived data and may be used to predict device or cartridge failure based on read errors or write errors or other data.

Figure 9:
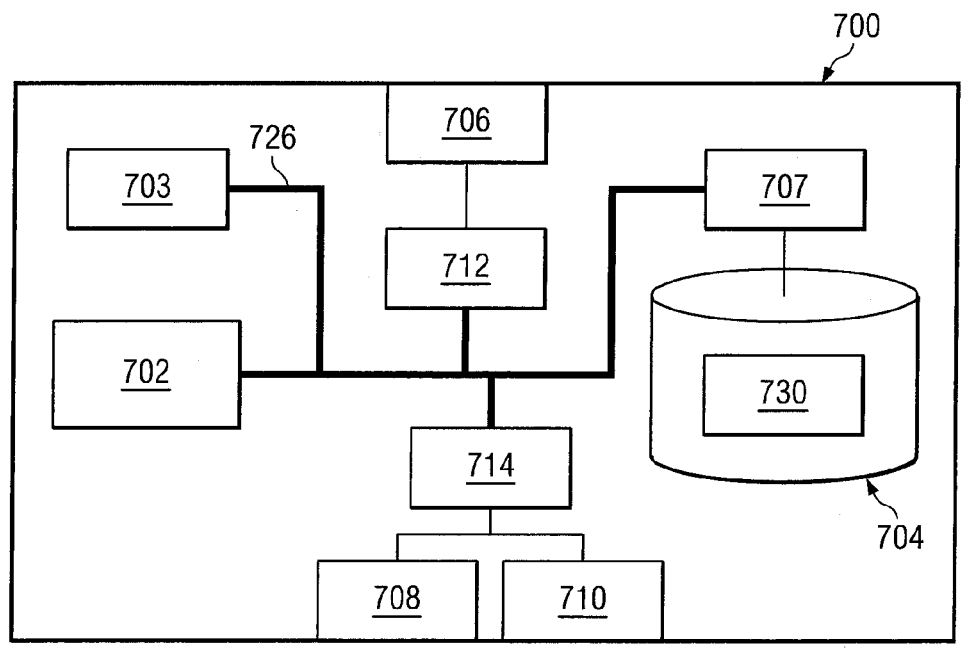
FIG. 9 is a block diagram of one example of a controller operable to collect or store data.

FIG. 9 is a diagrammatic representation of a monitoring appliance controller 700 ("controller 700"). Controller can include a processor 702, such as an Intel Pentium 4 based processor (Intel and Pentium are trademarks of Intel Corporation of Santa Clara, Calif.), a primary memory 703 (which may include, for example, RAM, ROM, Flash Memory, EEPROM or other computer readable medium known in the art) and a secondary memory 704 (which may include, for example, a hard drive, disk drive, optical drive or other computer readable medium known in the art). A memory controller 707 can control access to secondary memory 704. Controller 700 can comprise a communications interface 706 (which may comprise, for example, fibre channel interface, Ethernet port or other communications interface known in the art) to connect controller 700 to, for example, a switch of a network. An I/O controller 712 can control interactions with the switch. Similarly, an I/O controller 714 can control interactions over I/O interfaces 708 and 710. Controller 700 can include a variety of input devices. Various components of controller 700 can be connected by a bus 726.

Secondary memory 704 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 704 can store a software program 730 that collects, compiles, stores, organizes or processes data associated with a library or library components. During execution by processor 702, portions of program 730 can be stored in secondary memory 704 and/or primary memory 703.

Because a repository may contain data associated with a library and library components spanning a period, a user may access the data to monitor the library or library components over a period of time. For example, a user may use a user interface to display data associated with a library component for a desired period of time. The data may be displayed in a graphical format.

Figure 10:
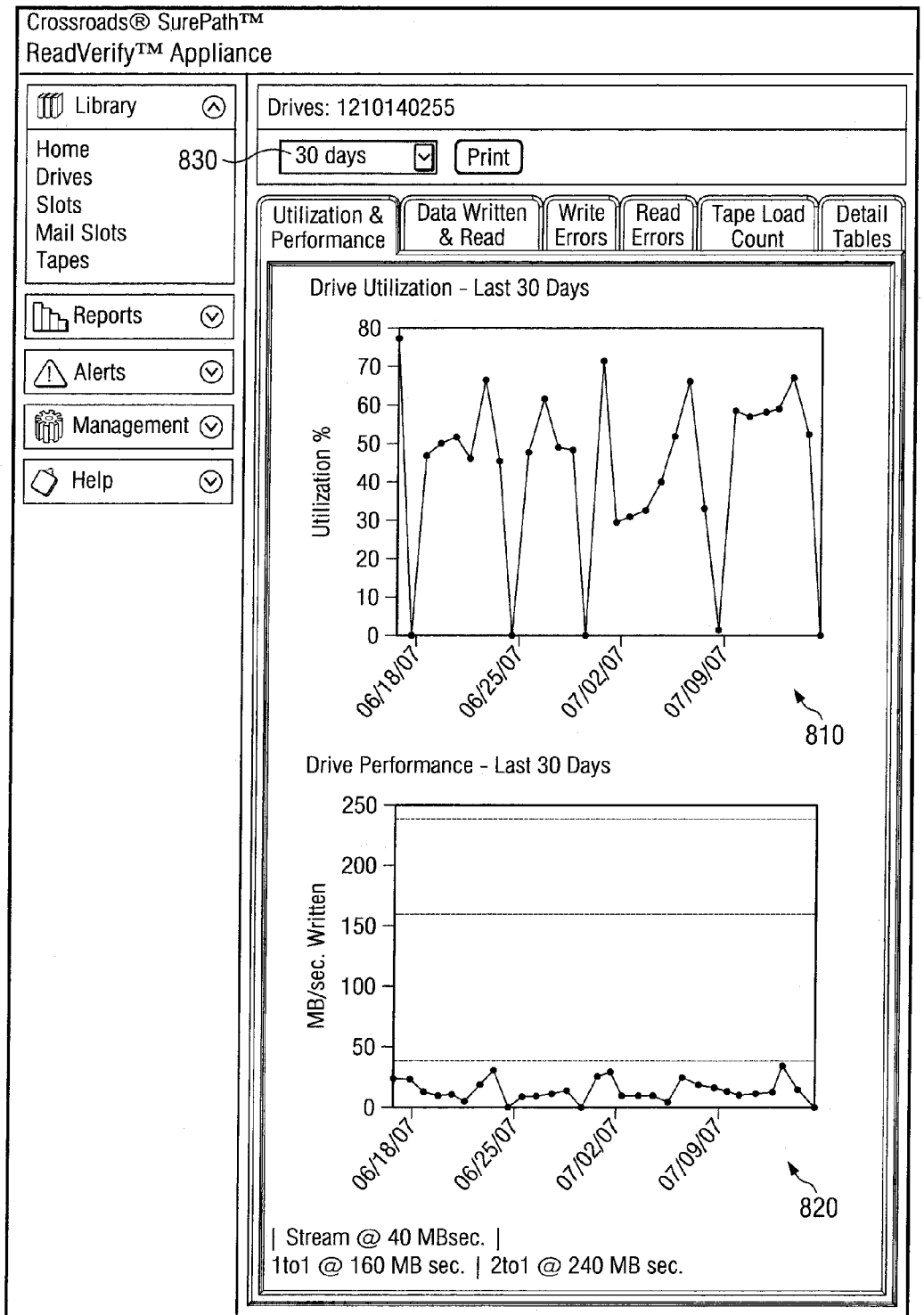
FIG. 10 is one example of a graphical user interface for displaying data.

FIGS. 10-15 are examples of representations of data associated with a library or library component(s) and contained in a repository. The representations are part of a GUI which may be utilized by a user to access and display data stored in a repository. FIG. 10 is one example of a graphical representation 800 of data associated with a drive. More specifically, graphical representation 800 displays data associated with a particular drive in drive utilization graph 810 and drive performance graph 820. Drive utilization graph 810 displays the drive utilization of a drive over a 30 day period. Drive performance graph 820 displays the drive performance over a 30 day period. Selector 830 can be used to select the period of time that the data displayed in graphs 810 and 820 spans.

Figure 11:
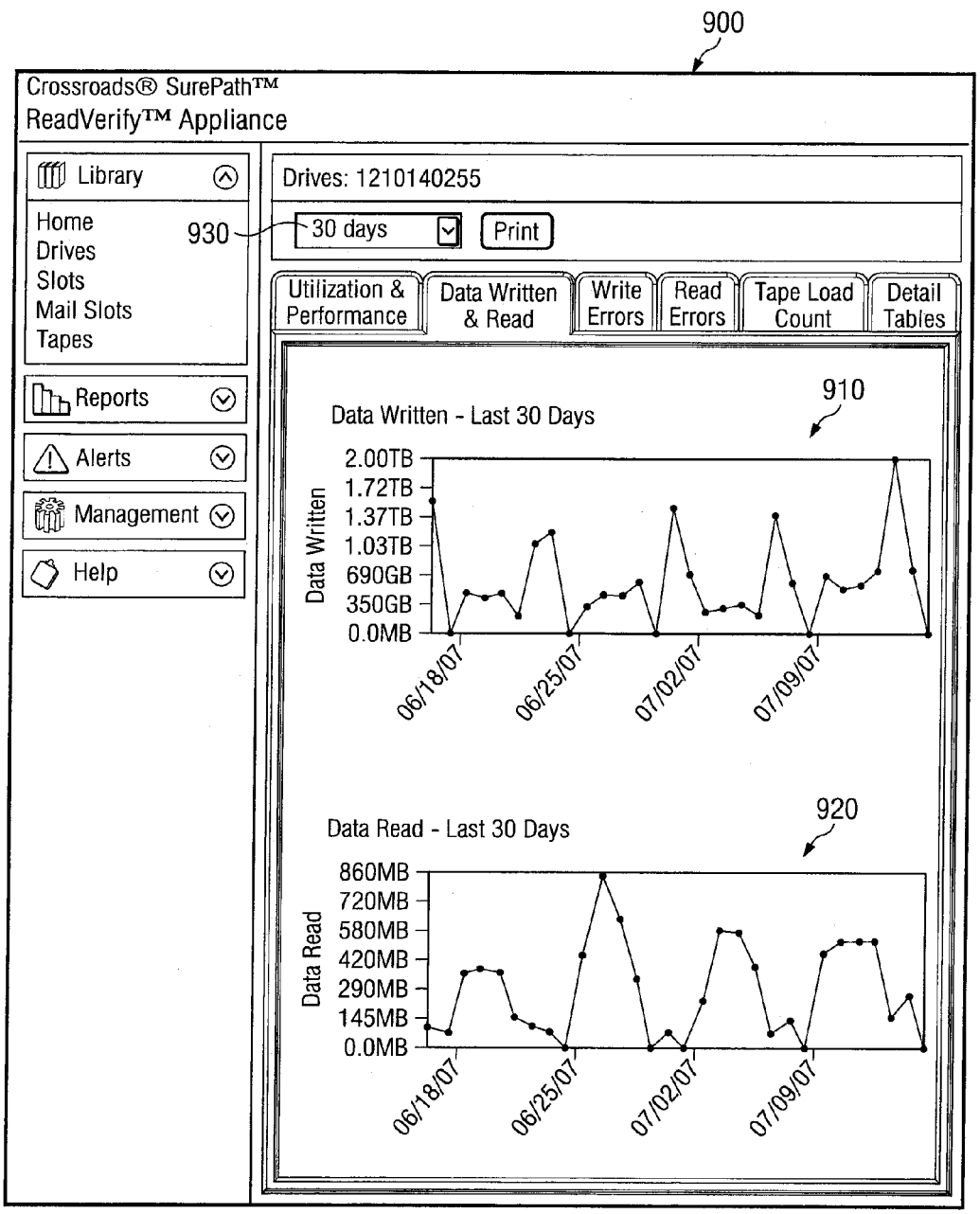
FIG. 11 is one example of a graphical user interface for displaying data.

FIG. 11 is one example of a graphical representation 900 of data associated with a drive. More specifically, graphical representation 900 displays data associated with a particular drive in data written graph 910 and data read graph 920. Data written graph 910 displays the amount of data written per day over a 30 day period. Data displayed in data written graph 910 may be derived from, for example, Log Sense pages 0xC, 0x32 or 0x39 returned in response to one or more LS commands. Data read graph 920 displays the amount of data read per day over a 30 day period. Selector 930 can be used to select the period of time that the data displayed in graphs 910 and 920 spans.

Figure 12:
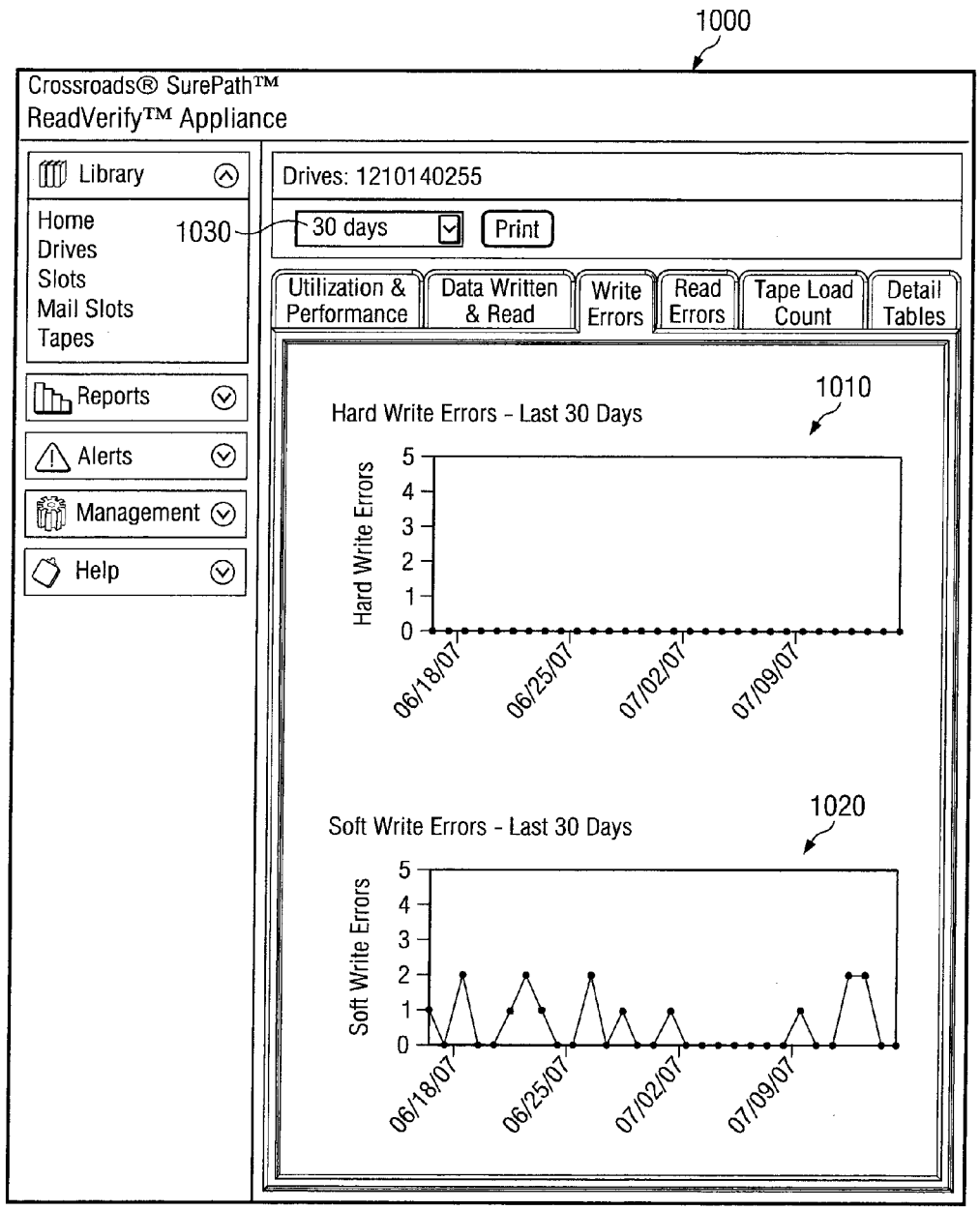
FIG. 12 is one example of a graphical user interface for displaying data.

FIG. 12 is one example of a graphical representation 1000 of data associated with a drive. More specifically, graphical representation 1000 displays data associated with a particular drive in hard write errors graph 1010 and soft write errors graph 1020. Hard write errors graph 1010 displays the occurrence of hard write errors associated with the drive over a 30 day period. Soft write errors graph 1020 displays the occurrence of soft write errors associated with the drive over a 30 day period. Selector 1030 can be used to select the period of time that the data displayed in graphs 1010 and 1020 spans.

Figure 13:
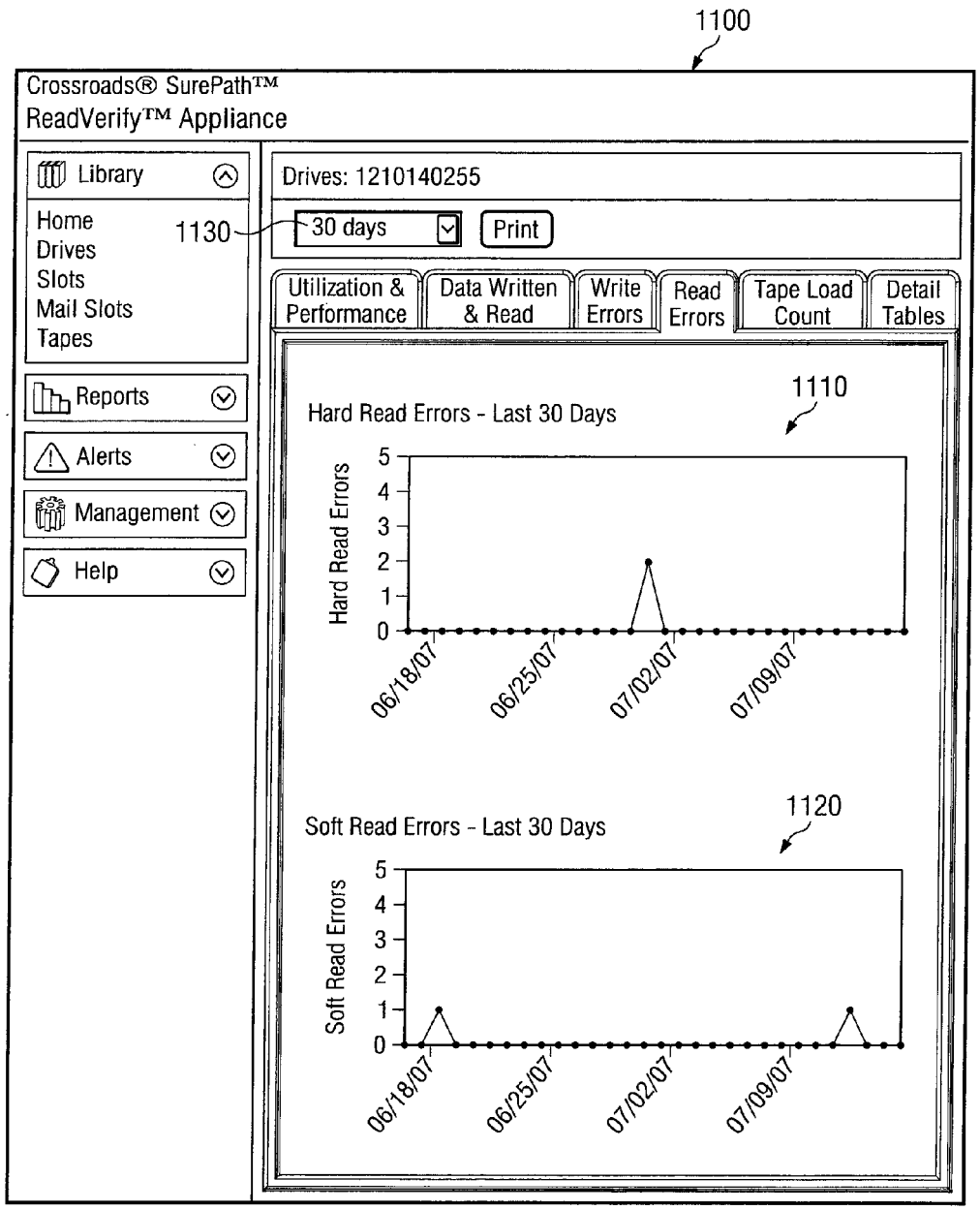
FIG. 13 is one example of a graphical user interface for displaying data.

FIG. 13 is one example of a graphical representation 1100 of data associated with a drive. More specifically, graphical representation 1100 displays data associated with a particular drive in hard read errors graph 1110 and soft read errors graph 1120. Hard read errors graph 1110 displays the occurrence of hard read errors encountered by the drive over a 30 day period. Soft read errors graph 1120 displays the occurrence of soft read errors encountered by the drive over a 30 day period. Selector 1130 can be used to select the period of time that the data displayed in graphs 1110 and 1120 spans.

Figure 14:
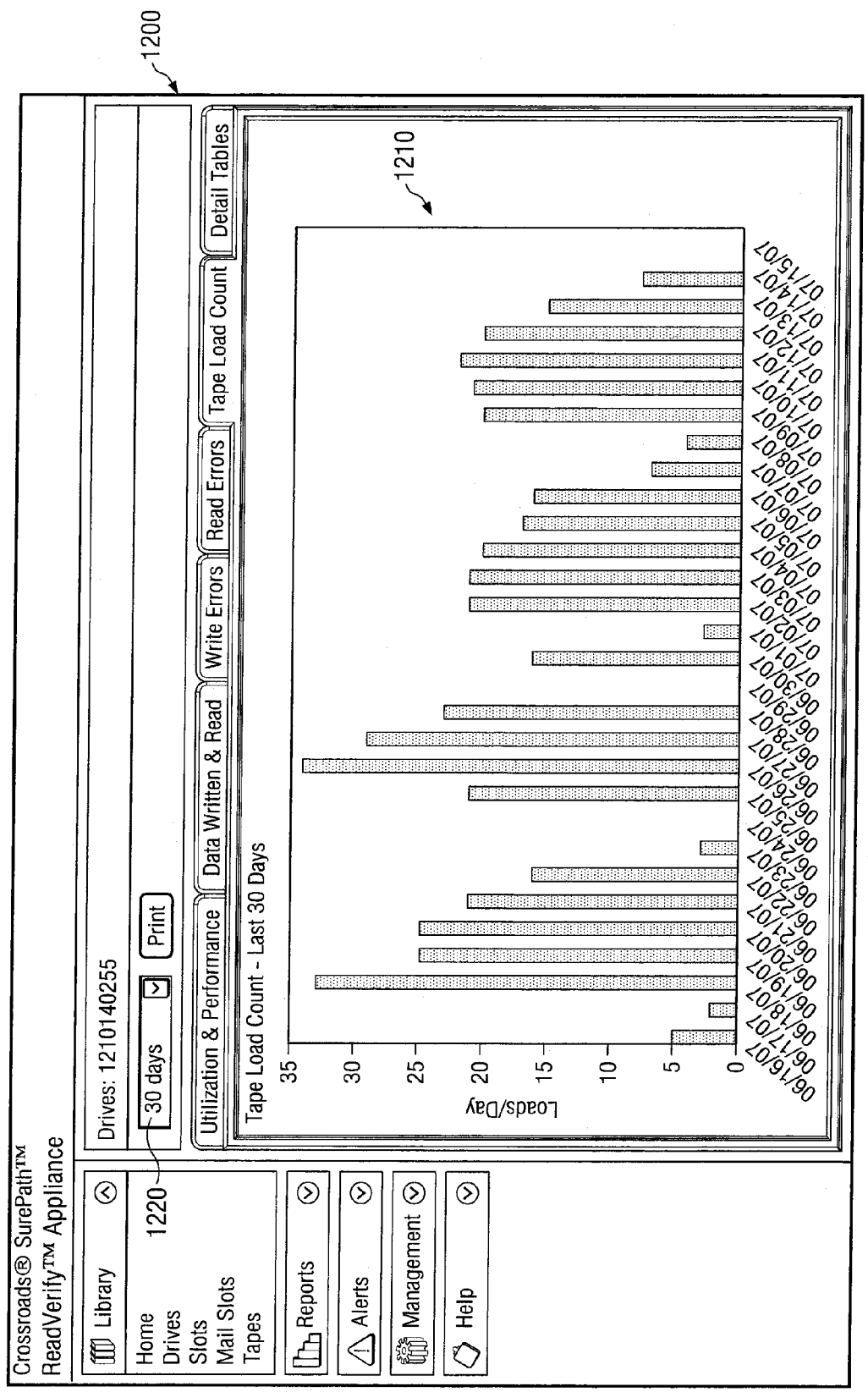
FIG. 14 is one example of a graphical user interface for displaying data.

FIG. 14 is one example of a graphical representation 1200 of data associated with a drive. More specifically, graphical representation 1200 displays data associated with a particular drive in tape load count graph 1210. Tape load count graph 1210 displays the number of tape loads of the drive on a daily basis over a 30 day period. Selector 1220 can be used to select the period of time that the data displayed in graph 1210 spans.

Figure 15:
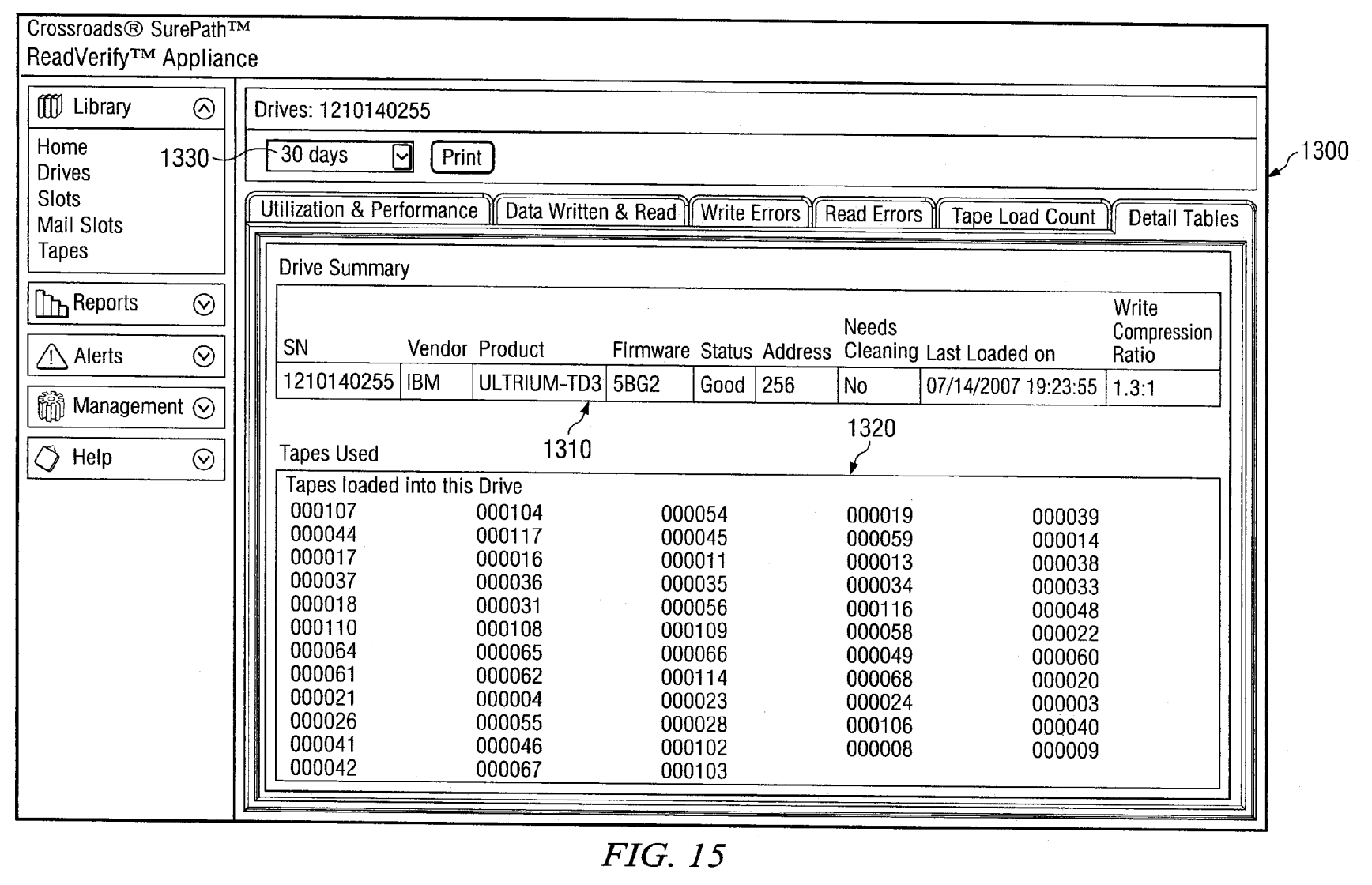

FIG. 15 is one example of a graphical representation 1300 of data associated with a drive. More specifically, graphical representation 1300 displays data associated with a particular drive in drive summary 1310 and tapes used list 1320. Drive summary 1310 displays drive data such as serial number, firmware version, whether the drive needs cleaning, or other drive data. Tapes used list 1320 lists the tapes loaded into the drive over a 30 day period. Selector 1130 can be used to select the period of time that the data displayed in list 1320 spans.

FIGS. 10-15 are provided by way of example, not limitation, and data associated with a library or library components may be presented in any number of ways. Furthermore, data contained in a repository may be accessed over a network using a host computer such that a user interface containing data from the repository may be displayed on a display associated with the host computer.

Embodiments can also be implemented with respect to libraries of media other than magnetic tapes. For example, the library can comprise a plurality of optical disks (i.e., an optical jukebox) or removable hard drives. Other libraries can utilize a combination of different storage media such as hard drives, magnetic media or optical media.

While systems and methods been described with reference to particular embodiments, it should be understood that the embodiments are illustrative and that the scope of the invention is not limited to these embodiments. For example, while embodiments described above have been described with regard to RES, LS and Inquiry commands, this is by way of illustration and not limitation. In some embodiments, other commands may be used to collect data associated with a library or library components. Many variations, modifications, additions and improvements to the embodiments described above are possible. It is contemplated that these variations, modifications, additions and improvements fall within the scope of the invention as detailed in the following claims.

What is claimed is:

1. A method of out-of-band monitoring of a media library, comprising:

performing an agentless collection process to collect data from the media library out-of-band from commands and responses between hosts and the media library, wherein the media library comprises one or more library components including one or more drives and a media changer and collecting data comprises querying the one or more library components of the media library at intervals and receiving returned data from the one or more library components, wherein querying the one or more library components comprises:

sending Log Sense (LS) commands to the one or more drives of the media library at intervals; and sending Read Element Status (RES) commands to the media changer at intervals;

storing the collected data in a repository, wherein storing the collected data in the repository comprises storing data returned in response to the LS commands or the RES commands in the repository, wherein the collected data in the repository spans a plurality of intervals;

deriving data from the collected data, wherein deriving data comprises deriving a metric associated with the media library over the plurality of intervals based on data returned in response to the LS commands over the plurality of intervals;

accessing a set of data in the repository based on one or more specifications; and providing the set of data based on one or more specifications.

2. The method of claim 1, further comprising forming one or more structures containing data returned in response to one or more LS or RES commands.

3. The method of claim 1, wherein the set of data comprises the derived data.

4. The method of claim 1, wherein the set of data comprises the collected data.

5. The method of claim 4, wherein providing the set of data comprises providing the collected data to another system for further processing.

6. The method of claim 1, wherein:
querying one or more library components further comprises sending one or more Inquiry commands to a drive or a media changer of the media library; and
storing the collected data in the repository comprises storing data returned in response to the Inquiry commands.

7. The method of claim 1, wherein:
querying one or more library components further comprises sending one or more additional commands to a drive or a media changer of the media library, wherein the additional commands comprise SCSI commands; and
storing the collected data in the repository comprises storing data returned in response to the one or more additional commands.

8. The method of claim 1, further comprising organizing the collected data.

9. A system for out-of-band monitoring of a media library comprising multiple components, comprising:
a data engine coupled to a network and configured to perform an agentless collection process to collect data from the media library out-of-band from commands and responses between hosts and the media library, wherein the media library comprises one or more library components including one or more drives and a media changer and the collection process comprises querying the one or more library components of the media library at intervals and receiving returned data from the one or more library components, wherein querying one or more library components comprises:
sending Log Sense (LS) commands to the one or more drives of the media library at intervals; and
sending Read Element Status (RES) commands to the media changer at intervals;

a storage engine configured to:
store the collected data in a repository over a plurality of intervals, wherein storing the collected data in the repository comprises storing data returned in response to the LS commands or the RES commands in the repository; and
derive data from the collected data, wherein deriving data comprises deriving a metric associated with the media library over the plurality of intervals based on data returned in response to the LS commands over the plurality of intervals;
an interface engine coupled to the repository and configured to connect to a communications link to:
access a set of data in the repository based on one or more specifications; and
provide the set of data based on one or more specifications.

10. The system of claim 9, wherein the storage engine is configured to form one or more structures containing data returned in response to one or more LS or RES commands.

11. The system of claim 9, wherein the set of data comprises the derived data.

12. The system of claim 9, wherein the set of data comprises the collected data.

13. The system of claim 12, wherein providing the set of data comprises providing the collected data to another system for further processing.

14. The system of claim 9, wherein:
querying one or more library components further comprises sending one or more Inquiry commands to a drive or a media changer of the media library; and
storing the collected data in the repository comprises storing data returned in response to the Inquiry commands.

15. The system of claim 9, wherein:
querying one or more library components further comprises sending one or more additional commands to a drive or a media changer of the media library, wherein the additional commands comprise SCSI commands; and
storing the collected data in the repository comprises storing data returned in response to the one or more additional commands.

16. The system of claim 9, wherein the interface engine is configured to display data to a user via a graphical user interface (GUI).

17. The system of claim 9, wherein the storage engine is further configured to perform organizing the collected data.

18. The system of claim 9, wherein a monitoring appliance comprises the data engine and the storage engine.

* * * * *